US012535490B2

United States Patent
Wang

(10) Patent No.: US 12,535,490 B2
(45) Date of Patent: Jan. 27, 2026

(54) AFFINITY CHROMATOGRAPHY-COUPLED NATIVE MASS SPECTROMETRY FOR ANTIBODY ANALYSIS

(71) Applicant: Regeneron Pharmaceuticals, Inc., Tarrytown, NY (US)

(72) Inventor: Shunhai Wang, Scarsdale, NY (US)

(73) Assignee: REGENERON PHARMACEUTICALS, INC., Tarrytown, NY (US)

( * ) Notice: Subject to any disclaimer, the term of this patent is extended or adjusted under 35 U.S.C. 154(b) by 717 days.

(21) Appl. No.: 16/935,962

(22) Filed: Jul. 22, 2020

(65) Prior Publication Data

US 2021/0025899 A1    Jan. 28, 2021

Related U.S. Application Data

(60) Provisional application No. 62/877,037, filed on Jul. 22, 2019, provisional application No. 62/907,485, filed on Sep. 27, 2019.

(51) Int. Cl.
G01N 33/68 (2006.01)
G01N 30/72 (2006.01)
(Continued)

(52) U.S. Cl.
CPC ..... *G01N 33/6848* (2013.01); *G01N 30/7233* (2013.01); *H01J 49/165* (2013.01);
(Continued)

(58) Field of Classification Search
None
See application file for complete search history.

(56) References Cited

U.S. PATENT DOCUMENTS

2015/0362506 A1    12/2015    Zhu et al.
2019/0194298 A1    6/2019    Wang

FOREIGN PATENT DOCUMENTS

WO    2013049410 A1    4/2013
WO    WO2013148373 A1    10/2013
(Continued)

OTHER PUBLICATIONS

Geiger, T. et al. Proteomics on an Orbitrap Benchtop Mass Spectrometer Using All-ion Fragmentation, Molecular & Cellular Proteomics 9.10, pp. 2252-2261 (Year: 2010).*
(Continued)

*Primary Examiner* — Xiaoyun R Xu
(74) *Attorney, Agent, or Firm* — BakerHostetler

(57) ABSTRACT

The present invention provides rapid, sensitive high-throughput methods and systems for characterizing peptides or proteins using affinity-based chromatography-coupled native mass spectrometry to improve manufacturing process of biopharmaceutical products, such as identifying impurities during antibody purification, monitoring post-translational modification variants during production, or characterizing drug-to-antibody ratio of antibody-drug conjugates. The separation profiles of the peptides or proteins are generated and compared to identify or qualify the peptides or proteins, wherein the separation profile is based on differential affinity binding.

19 Claims, 27 Drawing Sheets
(27 of 27 Drawing Sheet(s) Filed in Color)

(51) Int. Cl.
*H01J 49/16* (2006.01)
*H01J 49/42* (2006.01)

(52) U.S. Cl.
CPC ........ *H01J 49/4225* (2013.01); *H01J 49/425* (2013.01); *G01N 2440/38* (2013.01)

(56) References Cited

FOREIGN PATENT DOCUMENTS

WO  2016082044 A1  6/2016
WO  WO 2020/154598 A1  7/2020

OTHER PUBLICATIONS

Rabah Gahoual et al: "Detailed Characterization of Monoclonal Antibody Receptor Interaction Using Affinity Liquid Chromatography Hyphenated to Native Mass Spectrometry," Analytical Chemistry, vol. 89, No. 10, May 16, 2017 (May 16, 2017), pp. 5404-5412.

Canarelli S et al: "On-line microdialysis of proteins with high-salt buffers for direct coupling of electrospray ionization mass spectrometry and liquid chromatography," Journal of Chromatography A, Elsevier, Amsterdam, Nl, vol. 948, No. 1-2, Mar. 1, 2002 (Mar. 1, 2002), pp. 139-149.

Steffen Lippold et al: "Glycoform-resolved Fc[gamma]RII la affinity chromatography-mass spectrometry," MABS, vol. 11, No. 7, Oct. 3, 2019 (Oct. 3, 2019), pp. 1191-1196.

Markus Haberger et al: "Rapid characterization of biotherapeutic proteins by size-exclusion chromatography coupled to native mass spectrometry," MABS, vol. 8, No. 2,Dec. 10, 2015 (Dec. 10, 2015), pp. 331-339.

Tetyana Dashivets et al: "Multi-Angle Effector Function Analysis of Human Monoclonal IgG Glycovariants," PLOS ONE, vol. 10, No. 12, Dec. 11, 2015 (Dec. 11, 2015), p. e0143520.

Sankaran Praveen Kallamvalliillam et al: "Identification and quantification of product-related quality attributes in bio-therapeutic monoclonal antibodyviaa simple, and robust cation-exchange HPLC method compatible with direct online detection of UV and native ESI-QTOF-MS analysis," Journal of Chromatography B, Elsevier, Amsterdam, NL, vol. 1102, Oct. 21, 2018 (Oct. 21, 2018), pp. 83-95.

International Search Report, International Application No. PCT/2020/043098, Filing Date Jul. 22, 2020, Dated Oct. 23, 2020.

Makarov, A. et al., "Performance Evaluation of a Hybrid Linear Ion Trap/Orbitrap Mass Spectronmeter," Anal. Chem. vol 78, pp. 2113-2120. 2006.

Gale et al., Small volume and low flow-rate electrospray Ionization mass spectrometry of aqueous samples, Rapid Communications in Mass Spectrometry, 7(11): 1017-1021, Nov. 1993, DOI: 10.1002/rcm.1290071111.

Rosati et al., Exploring an Orbitrap Analyzer for the Characterization of Intact Antibodies by Native Mass Spectrometry, Angewandte Chemie International Edition, 51(52): 12992-12996, Nov. 2012, DOI: 10.1002/ANIE.201206745.

A. Makarov "Mass spectrometry based on the orbital ion trap: achievements and prospects" [in Russian], vol. 5, 2013, pp. 30-36.

Möhring et al., Principles and Applications of Mass Spectrometers With Orbitrap Ion Traps, Japan Analytical Chemistry, 12: 526-531, with 11 page Machine translation from Google Translate, 2018.

\* cited by examiner

|  | $M_{theo}$ (Da) | $M_{exp}$ (Da) |
|---|---|---|
| G0F/G0F | 148,036.4 | 148,039.2 |
| G0F/G1F | 148,198.6 | 148,200.2 |
| G1F/G1F | 148,360.7 | 148,360.3 |

Titers of MAB4 in cell culture time course samples

| Day | Fc*/Fc Titer (mg/mL) |
|---|---|
| 1 | 0.002842505 |
| 2 | |
| 3 | |
| 4 | |
| 5 | 0.270078506 |
| 6 | 0.544304624 |
| 7 | |
| 9 | |
| 10 | 1.224500254 |
| 11 | 1.412829501 |
| 12 | 1.423263484 |

AFFINITY CHROMATOGRAPHY-COUPLED NATIVE MASS SPECTROMETRY FOR ANTIBODY ANALYSIS

FIELD

The present invention generally pertains to methods and systems for characterizing peptides or proteins using affinity-based chromatography-coupled native mass spectrometry. The present invention provides rapid sensitive high-throughput methods and systems for the characterization of peptides or proteins.

BACKGROUND

Therapeutic peptides or proteins are generally expressed in cell culture suspension for production. Subsequently, the peptides or proteins are purified to remove process related impurities. The product quality attributes of the purified therapeutic peptides or proteins are extensively characterized to ensure preservation of their associated safety, efficacy and shelf-life profiles relevant to pharmacokinetics.

Alterations of therapeutic peptides or proteins may occur at any point during and after the peptides or proteins are produced and/or purified. The therapeutic peptides or proteins can become heterogeneous due to various post-translational modifications, protein degradation, enzymatic modifications, and chemical modifications. These alterations to the biophysical characteristics of biopharmaceutical products may affect associated safety, efficacy, and shelf-life.

It will be appreciated that a need exists for developing high-throughput analytical methods and systems that provide insights to improve the manufacturing process of biopharmaceutical products. It is highly desirable that the analytical method can be conducted in a short period of time to achieve a rapid sensitive high-throughput analytical tool for providing critical improvement for controlling production and purification of high-quality biopharmaceutical products.

SUMMARY

Developing high-throughput analytical methods and systems can be critical for improving manufacturing process of biopharmaceutical products by monitoring production and purification of biopharmaceutical products. This disclosure provides methods and systems to satisfy the aforementioned demands by providing rapid sensitive high-throughput analytical methods and systems based on affinity-based chromatography-coupled native mass spectrometry to improve manufacturing process of biopharmaceutical products.

The disclosure provides a method for identifying at least one peptide or protein in a sample, comprising: contacting the sample to a solid surface, wherein the solid surface comprises an affinity-binding molecule of the at least one peptide or protein; washing the solid surface using a mobile phase to produce at least one eluent, wherein the eluent comprises the at least one peptide or protein; characterizing the at least one peptide or protein in the at least one eluent under native conditions using a mass spectrometer.

In some exemplary embodiments, the method for identifying at least one peptide or protein in a sample further comprises generating at least one separation profile In some exemplary embodiments, the method for identifying at least one peptide or protein in a sample further comprises identifying or quantifying the at least one peptide or protein based on the at least one separation profile.

In some exemplary embodiments, the method for identifying at least one peptide or protein in a sample further comprises identifying or quantifying a level of post-translational modification or post-translational modification variation of the at least one peptide or protein based on the at least one separation profile or a comparison with another separation profile.

In some exemplary embodiments, the method for identifying at least one peptide or protein in a sample further comprises identifying or quantifying a level of glycosylation or glycosylation variation of the at least one peptide or protein based on the at least one separation profile or a comparison with another separation profile, wherein the glycosylation is terminal galactose, Fc glycan occupancy, core fucose, bisecting GlcNAc, or Man5.

In some exemplary embodiments, the method for identifying at least one peptide or protein in a sample further comprises separating or identifying an impurity in the sample based on the at least one separation profile or a comparison with another separation profile In some exemplary embodiments, the method for identifying at least one peptide or protein in a sample further comprises at least one peptide or protein that is a drug, an antibody, a bispecific antibody, a monoclonal antibody, a fusion protein, an antibody-drug conjugate, an antibody fragment, or a protein pharmaceutical product.

In some aspects, the method for identifying at least one peptide or protein in a sample further comprises quantifying a drug-to-antibody ratio of the antibody-drug conjugate based on the at least one separation profile or a comparison with another separation profile.

In some exemplary embodiments, the method for identifying at least one peptide or protein in a sample further comprises a chromatography column that comprises the solid surface and the affinity-binding molecule of the at least one peptide or protein.

In some exemplary embodiments, the method for identifying at least one peptide or protein in a sample further comprises a mass spectrometer that is coupled online to the chromatography column.

In some exemplary embodiments, the affinity-binding molecule of the at least one peptide or protein is protein A, protein G, Fcγ receptor, FcγRIIIa, anti-human Fc antibody, neonatal Fc receptor, Fc epsilon RI, anti-idiotype antibody, or complement component C1q.

In some exemplary embodiments, the method for identifying at least one peptide or protein in a sample further comprises a splitter that is used to connect the mass spectrometer and the chromatography column.

In some aspects, the method for identifying at least one peptide or protein in a sample further comprises a splitter that is used to divert a low flow to the mass spectrometer and a high flow to a detector.

In some exemplary embodiments, the method for identifying at least one peptide or protein in a sample further comprises a mobile phase that is an acidic solution and the obtained eluent is characterized using the mass spectrometer under native conditions without a pretreatment.

In some aspects, the method for identifying at least one peptide or protein in a sample further comprises a mobile phase that includes ammonium acetate, acetic acid, or a combination thereof.

In other aspects, the method for identifying at least one peptide or protein in a sample further comprises a mobile phase that is used to wash the chromatography column and has a flow rate of about 0.2-0.6 mL/min.

In other aspects, the method for identifying at least one peptide or protein in a sample further comprises a mass spectrometer that is an electrospray ionization mass spectrometer, nano-electrospray ionization mass spectrometer, a triple quadrupole mass spectrometer, a quadrupole mass spectrometer or a ultra-high mass range hybrid quadrupole mass spectrometer.

In some exemplary embodiments, the method for identifying at least one peptide or protein in a sample further comprises an orbitrap mass analyzer.

The disclosure, at least in part, provides a system for identifying at least one peptide or protein, comprising: a sample comprising the at least one peptide or protein; a chromatography column comprising an affinity-binding molecule of the at least one peptide or protein, wherein the chromatography column is capable of being washed by a mobile phase to generate an eluent; a mass spectrometer capable of characterizing or quantifying the at least one peptide or protein, wherein the mass spectrometer is capable of being run under native condition, and being coupled online to the chromatography column.

In some aspects, the system for identifying at least one peptide or protein further comprises a splitter that is used to connect the mass spectrometer and the chromatography column.

In some aspects, the system for identifying at least one peptide or protein further comprises a splitter that is used to divert a low flow to the mass spectrometer and to a high flow to a detector.

In some exemplary embodiments, the system for identifying at least one peptide or protein further comprises a mobile phase that is an acidic solution and the obtained eluent is characterized using the mass spectrometer without pretreatment.

In some aspects, the system for identifying at least one peptide or protein further comprises a mobile phase that includes ammonium acetate, acetic acid, or a combination thereof.

In other aspects, the system for identifying at least one peptide or protein further comprises a mobile phase that has a flow rate of about 0.2-0.6 mL/min.

In some exemplary embodiments, the system for identifying at least one peptide or protein comprises a diode-array detector or a photodiode array detector.

In some exemplary embodiments, the system for identifying at least one peptide or protein further comprises at least one peptide or protein that is a drug, an antibody, a bispecific antibody, a monoclonal antibody, a fusion protein, an antibody-drug conjugate, an antibody fragment, or a protein pharmaceutical product.

In some aspects, the system for identifying at least one peptide or protein further comprises a mass spectrometer that is an electrospray ionization mass spectrometer, nano-electrospray ionization mass spectrometer, a triple quadrupole mass spectrometer, or a ultra-high mass range hybrid quadrupole mass spectrometer.

In some exemplary embodiments, the system for identifying at least one peptide or protein further comprises an orbitrap mass analyzer.

In some exemplary embodiments, the system for identifying at least one peptide or protein comprises an affinity-binding molecule of the at least one peptide or protein, wherein the affinity-binding molecule of the at least one peptide or protein is protein A, protein G, Fcγ receptor, FcγRIIIa, anti-human Fc antibody, neonatal Fc receptor, Fc epsilon RI, anti-idiotype antibody, or complement component C1q.

These, and other, aspects of the invention will be better appreciated and understood when considered in conjunction with the following description and the accompanying drawings. The following description, while indicating various embodiments and numerous specific details thereof, is given by way of illustration and not of limitation. Many substitutions, modifications, additions, or rearrangements may be made within the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
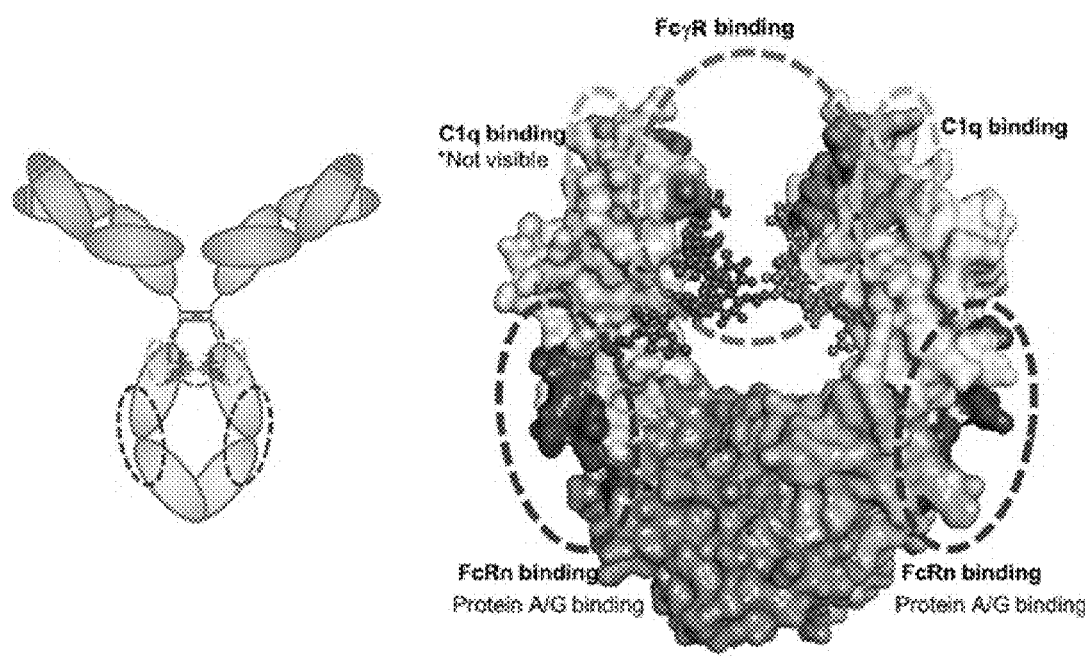
FIG. 1A shows multiple binding sites in the molecule structure of antibody for affinity intermolecular interactions and binding affinity values between antibody and biologic molecules.
Figure 1A:

The production and manufacturing of biopharmaceutical products are surrounded by various processes and technologies. After the expression and production of the therapeutic peptides or proteins in cell culture suspension, the peptides or proteins can be purified to remove process related impurities. The purified therapeutic peptides or proteins can be extensively characterized to ensure the preservation of their associated safety, efficacy and shelf-life profiles relevant to pharmacokinetics and product quality attributes.

Therapeutic peptides or proteins can become heterogeneous due to various post-translational modifications (PTMs), protein degradation, enzymatic modifications, and chemical modifications which can be introduced at any point during and after the production and purification of peptides or proteins. Identification and characterization of the heterogeneous variants are critical to controlling the quality attributes of the biophysical characteristics of biopharmaceutical products. There are needs in the biopharmaceutical industry for rapid sensitive high-throughput analytical methods to control and monitor the production and purification of therapeutic peptides or proteins, such as the production of monoclonal antibodies or antibody-drug conjugates.

Bispecific antibodies are highly valuable biopharmaceutical products, since they can target two different antigens. The designs of bispecific antibodies can be directed to targeting multiple tissue-specific antibodies combined with use of small molecule drugs, such as combining multiple tissue-specific antibodies and cytotoxic drugs to release drugs in close proximity to tumors. Small drug molecules can be conjugated to the purified bispecific antibodies to produce antibody-drug conjugates (ADC). Expression and purification of bispecific antibodies can be challenging due to the needs of removing impurities, such as removing the parental monospecific antibodies. The monitoring and determination of drug-to-antibody ratios of ADCs is critical for the quality control of ADCs.

This disclosure provides methods and systems to satisfy the aforementioned demands by providing high-throughput analytical methods and systems based on affinity-based chromatography-coupled native mass spectrometry to improve manufacturing process of biopharmaceutical products, such as identifying impurities during antibody purification, monitoring post-translational modification variants during production, or characterizing drug-to-antibody ratio of antibody-drug conjugates. In particular, the analytic methods and systems of the present application can be sensitive and can be conducted in short period of time to achieve a rapid sensitive high-throughput analytic tool for providing critical improvement in controlling production and purification of biopharmaceutical products.

Native mass spectrometry is an approach to study intact biomolecular structure in the native or near-native state. The term "native" refers to the biological status of the analyte in solution prior to subjecting to the ionization. Several parameters, such as pH and ionic strength, of the solution containing the biological analytes can be controlled to maintain the native folded state of the biological analytes in solution. Commonly, native mass spectrometry is based on electrospray ionization, wherein the biological analytes are sprayed from a nondenaturing solvent. Other terms, such as noncovalent, native spray, electrospray ionization, nondenaturing, macromolecular, or supramolecular mass spectrometry can also be describing native mass spectrometry. (Leney et al., J. Am. Soc. Mass Spectrom, 2017, 28, pages 5-13, Native Mass Spectrometry: what is in the name)

The present application provides affinity-based chromatography separation coupled with native mass spectrometry, which offers a powerful analytical tool for rapid sensitive high-throughput screening or identification of peptides or proteins. In some embodiments, the high-throughput analytical methods and systems of the present application are based on a rapid online approach of coupling affinity-based chromatography column to the mass spectrometer. In the methods and systems of the present application, the separation profiles of peptides or protein can be generated based on differential affinity binding, such as differential protein A affinity binding or differential FcγRIIIa affinity binding, and subsequently intact biomolecular structures of the peptides or proteins in native or near-native states can be characterized using mass spectrometry.

In an exemplary embodiment, the affinity-based chromatography can include various affinity intermolecular interactions between biologic molecules with various binding affinity values, such as the affinity interactions relevant to the multiple binding sites in the molecule structure of antibody including the binding sites for protein A, protein G, Fcγ receptor (FcγR), complement component C1q, or neonatal Fc receptor (FcRn), as shown in FIG. 1A (Irani et al., Molecular Immunology, 67 (2015) 171-182; Guilliams et al., Nature Reviews Immunology 14 (2014) 94-108).

In an aspect, the affinity-based chromatography is protein A chromatography, protein G chromatography, Fcγ receptor (FcγR) chromatography, FcγRIIIa chromatography, anti-human Fc antibody chromatography, neonatal Fc receptor (FcRn) chromatography, Fc epsilon RI (FcεRI) chromatography, anti-idiotype antibody chromatography, or complement component C1q chromatography.

The fragment crystallisable (Fc) region of antibody interacts with various molecules to mediate indirect effector functions, such as antibody-dependent cellular cytotoxicity (ADCC), antibody-dependent cellular phagocytosis (ADCP), or complement-dependent cytotoxicity (CDC) (Irani et al.). Among these affinity intermolecular interactions, FcγR is involved in ADCC. ADCC is an immune mechanism that Fc receptor-bearing effector cells recognize and kill antibody-coated target cells expressing tumor-derived or pathogen-derived surface antigens. Since natural killer cell FcγRIIIa receptors can recognize cell-bound antibodies, signaling through FcγRIIIa can trigger the release of cytokines and cytotoxic granuals to mediate apoptosis of tumor cells. Modifying the interactions of antibodies through FcγRIIIa can contribute to cancer immunotherapy. Since FcγRs exhibit various binding affinity values for various IgG subclasses as shown in FIG. 1A, one approach of the immunotherapy is to enhance ADCC functionality by altering the affinity binding of Fc region to increase binding affinity for FcγRIIIa activation. These approaches include site-directed mutagenesis, modifying the glycosylation of Fc domain or removing the fucosylation of the Fc domain.

The present application provides an online FcγRIIIa affinity chromatography coupled with native mass spectrometry method to quickly evaluate FcγRIIIa affinity or ADCC activity which can vary with various IgG formats. In some exemplary embodiments, IgG1 (fucose minus) has the greatest strength of FcγRIIIa affinity or ADCC activity and followed by IgG1, IgG4 or IgG4S (e.g., IgG1 (fucose minus)>IgG1>IgG4>IgG4S). Different glycoforms and species of different glycan occupancies can be separated and characterized using the method and system of the FcγRIIIa affinity chromatography-coupled native mass spectrometry of the present application. In some aspects, increased glycan occupancy, increased terminal galactose, or reduced core fucose led to increased FcγRIIIa affinity or ADCC activity. In some aspects, reduced bisecting GlcNAc or increased Man5 led to reduced FcγRIIIa affinity or ADCC activity. The method and system of the FcγRIIIa affinity chromatography-coupled native mass spectrometry of the present application can reduce the complexity of the sample to provide glycan-based separation.

Figure 1B:
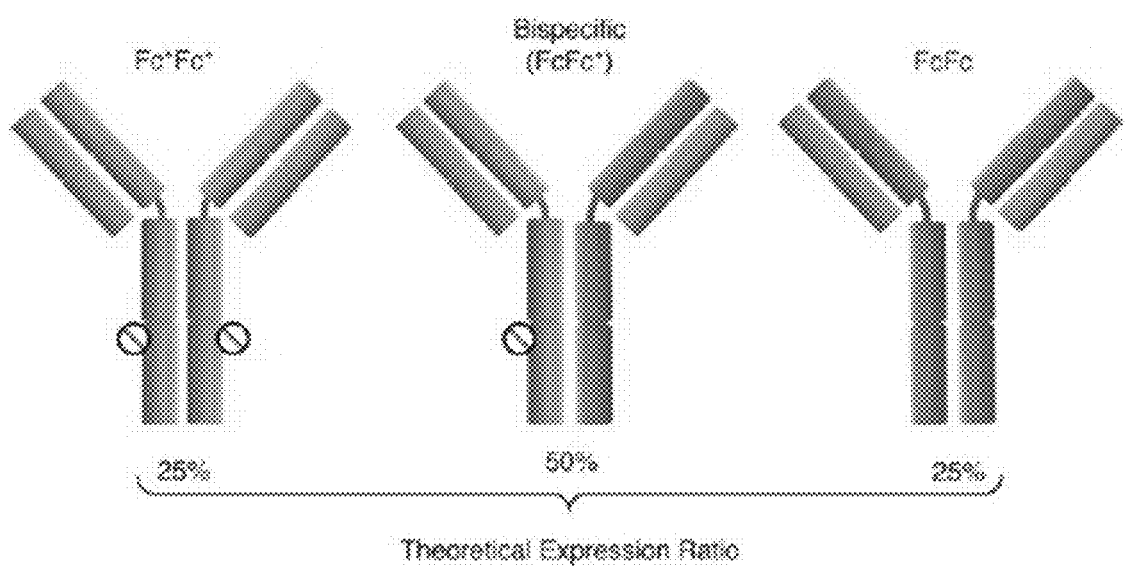
FIG. 1B shows a bispecific antibody and its parental monospecific antibodies which are subjected to characterizations or purification according to an exemplary embodiment. The format of a bispecific antibody includes pairing two different heavy chains with two common light chains, which enables two unique antigen-binding sites targeting two different antigens according to an exemplary embodiment. One arm in heavy chains of the bispecific antibody has a two amino acid substitution, for example, substituted HY with RF, referred as star-substitution or Fc* according to an exemplary embodiment.

Among these affinity intermolecular interactions, protein A affinity binding can be used to facilitate the antibody purification or separation. Substitutions of two amino acids in the Fc regions of the heavy chains of antibody abrogate protein A binding, for example, substituted HY with RF referred as star-substitution or Fc* as shown in FIG. 1B. This star-substitution contributes to the difference in the binding to protein A, which may facilitate the antibody purification or separation among the bispecific antibody and its parental monospecific antibodies based on protein A affinity chromatography.

Among the various detection modes that can be coupled with affinity-based chromatography, mass spectrometry allows precise and accurate identification of individual components in complex samples. Several parameters, such as pH range, of the solution containing the biological analytes should be controlled to maintain the native folded state of the biological analytes for conducting native mass spectrometry. It is unexpected that the biological status of the analytes, for example, peptides or proteins, in solution is maintained at the native or native-like folded state after the elution of affinity-based chromatography column and prior to subjecting to the ionization step of mass spectrometry. In some exemplary embodiments, the mobile phase is an acidic solution and the eluent from affinity-based chromatography column, such as protein A column, is characterized using the mass spectrometer directly without a pretreatment to change the mobile phase or adjusting the pH value of the mobile phase. Despite the acidic conditions that are required for eluting peptides or proteins from the affinity-based chromatography column, such as protein A column, native or native-like charge states of the peptides or proteins can be maintained across the elution profile which indicates negligible denaturation using the methods and systems of the present application.

The methods and systems of the present application are advantageous for providing high-throughput methods and systems that provide mechanistic insights for improving manufacturing process of therapeutic peptides or proteins. In particular, the present application can provide rapid, sensitive high-throughput methods and systems to characterize antibodies, antibody variants, or antibody-drug conjugates by combining affinity-based chromatography with intact native mass spectrometry.

In one aspect, monoclonal antibodies or antibody variants containing specific post-translational modifications are evaluated using the high-throughput methods and systems of the present application by combining affinity-based chromatography with intact native mass spectrometry. In some preferred aspects, the methods and systems of the present application can be used to identify or quantify a level of post-translational modification or post-translational modification variation of the monoclonal antibodies or antibody variants.

In one aspect, monoclonal antibodies or antibody variants containing specific glycosylation are evaluated using the high-throughput methods and systems of the present application by combining affinity-based chromatography with intact native mass spectrometry. In some preferred aspects, the methods and systems of the present application can be used to identify or quantify a level of glycosylation or glycosylation variation of the monoclonal antibodies or antibody variants.

In one aspect, the present application provides sensitive, high-throughput analytical methods and systems to characterize the impact of different amino acid modifications of the therapeutic proteins, when protein A is used to purify the therapeutic proteins, such as bispecific monoclonal antibodies. In some preferred aspects, the methods and systems of the present application are used to separate or identify an impurity in the sample based on a comparison of the at least one separation profile, wherein the separation profile is based on differential affinity binding, such as differential protein A affinity binding or differential FcγRIIIa affinity binding.

In one aspect, the present application provides sensitive, high-throughput analytical methods and systems to identify or quantify the drug-to-antibody ratio of an antibody-drug conjugate using the high-throughput methods and systems of the present application by combining affinity-based chromatography with intact native mass spectrometry. In some preferred aspects, the antibody-drug conjugate to be analyzed is a lysine-linked or cysteine-linked antibody-drug conjugate. The present application is particularly advantageous by providing high peak capacity coupled with uniform elution of species with different drug-to-antibody ratios in combination with sensitive mass spectrometry detection under native condition.

In one aspect, the present application provides sensitive, high-throughput analytical methods and systems to identify or quantify monoclonal antibodies or antibody variants containing specific glycosylation by combining FcγRIIIa affinity chromatography with intact native mass spectrometry. In some preferred aspects, the methods and systems of the present application can be used to identify or quantify a level of glycosylation or glycosylation variation of the monoclonal antibodies or antibody variants using glycan-based separation or changes of glycoforms, wherein the glycosylation is terminal galactose, Fc glycan occupancy, core fucose, bisecting GlcNAc, or Man5.

Considering the limitations of existing methods, exemplary embodiments disclosed herein satisfy the long felt needs of providing rapid, sensitive high-throughput analytical methods and systems based on affinity-based chromatography-coupled native mass spectrometry to improve manufacturing process of biopharmaceutical products including identifying impurities during antibody purification, monitoring post-translational modification variants during production, and characterizing drug-to-antibody ratio of antibody-drug conjugates.

The term "a" should be understood to mean "at least one"; and the terms "about" and "approximately" should be understood to permit standard variation as would be understood by those of ordinary skill in the art; and where ranges are provided, endpoints are included.

As used herein, the terms "include," "includes," and "including," are meant to be non-limiting and are understood to mean "comprise," "comprises," and "comprising," respectively.

In some exemplary embodiments, the disclosure provides a method for identifying at least one peptide or protein in a sample, comprising: contacting the sample to a solid surface, wherein the solid surface comprises an affinity-binding molecule of the at least one peptide or protein; washing the solid surface using a mobile phase to produce at least one eluent, wherein the eluent comprises the at least one peptide or protein; characterizing the at least one peptide or protein in the at least one eluent using a mass spectrometer under native conditions.

In some exemplary embodiments, the disclosure provides a system for identifying at least one peptide or protein, comprising: a sample comprising the at least one peptide or protein; a chromatography column comprising an affinity-binding molecule of the at least one peptide or protein, wherein the chromatography column is capable of being washed by a mobile phase to generate an eluent; a mass spectrometer capable of characterizing or quantifying the at least one peptide or protein, wherein the mass spectrometer is capable of being run under native conditions, and being coupled online to the chromatography column.

As used herein, the term "affinity" or "affinity-binding molecule" refers to affinity intermolecular interactions, such as the strength of the interaction between a single biomolecule and its binding partner, or ligand. The intermolecular interactions can include non-covalent intermolecular interactions such as hydrogen bonding, electrostatic interactions, hydrophobic and Van der Waals forces between two molecules. Shape complementarity is also crucial for the affinity intermolecular interactions. The possible affinity toward a target molecule can be obtained with a ligand having a mirror image of the shape of the target surface with a complementing charge distribution. Binding affinity, for example, strength of the interactions, can be measured by the equilibrium dissociation constant (Kd) to rank order strengths of bimolecular interactions. The affinity binding of two molecules can be viewed as the strength of the interaction for binding reversibly. The dissociation constant defines the likelihood that an interaction between two molecules will break. (Eaton et al., Let's get specific: the relationship between specificity and affinity, Chemistry & Biology, October 1995, volume 2, No. 10, pages 633-638, Current Biology Ltd, ISSN 1074-5521; Panagiotis et al., 2013, On the binding affinity of macromolecular interactions: daring to ask why proteins interact, Journal of the Royal Society Interface, 10:20120835, http://dx.doi.org/

10.1098/rsif.2012.0835). The affinity-binding molecule can be immobilized on a solid surface or a solid phase. By "solid surface" or "solid phase" is meant a non-aqueous matrix to which the affinity-binding molecule can adhere. The solid phase of interest herein can comprise a glass or silica surface. The solid phase may be a purification column or a discontinuous phase of discrete particles.

As used herein, the term "native" in the description of "using a mass spectrometer under native condition" refers to the biological status of the analyte in solution prior to subjecting to the ionization. As used herein, the term "native conditions" or "native mass spectrometry" can include a performing mass spectrometry under conditions that preserve non-covalent interactions in an analyte. For detailed review on native MS, refer to the review: Elisabetta Boeri Erba & Carlo Petosa, The emerging role of native mass spectrometry in characterizing the structure and dynamics of macromolecular complexes, 24 PROTEIN SCIENCE 1176-1192 (2015).

As used herein, the term "mass spectrometer" includes a device capable of identifying specific molecular species and measuring their accurate masses. The term is meant to include any molecular detector into which a polypeptide or peptide may be eluted for detection and/or characterization. A mass spectrometer can include three major parts: the ion source, the mass analyzer, and the detector. The role of the ion source is to create gas phase ions. Analyte atoms, molecules, or clusters can be transferred into gas phase and ionized either concurrently (as in electrospray ionization). The choice of ion source depends heavily on the application.

In some exemplary embodiments, in the method for identifying at least one peptide or protein in a sample, the at least one peptide or protein is a drug, an antibody, a bispecific antibody, a monoclonal antibody, a fusion protein, an antibody-drug conjugate, an antibody fragment, or a protein pharmaceutical product. In some preferred aspects, the at least one peptide or protein contains a Fc region of an antibody, wherein the Fc region provides the affinity interaction with the affinity-based chromatography column.

As used herein, the term "peptide" or "protein" includes any amino acid polymer having covalently linked amide bonds. Proteins comprise one or more amino acid polymer chains, generally known in the art as "peptide" or "polypeptides". A protein may contain one or multiple polypeptides to form a single functioning biomolecule. In some exemplary aspects, the protein can be an antibody, a bispecific antibody, a multispecific antibody, antibody fragment, monoclonal antibody, host-cell protein or combinations thereof.

As used herein, a "protein pharmaceutical product" includes an active ingredient which can be fully or partially biological in nature. In some exemplary embodiments, the protein pharmaceutical product can comprise a peptide, a protein, a fusion protein, an antibody, an antigen, vaccine, a peptide-drug conjugate, an antibody-drug conjugate, a protein-drug conjugate, cells, tissues, or combinations thereof. In some other exemplary aspects, the protein pharmaceutical product can comprise a recombinant, engineered, modified, mutated, or truncated version of a peptide, a protein, a fusion protein, an antibody, an antigen, vaccine, a peptide-drug conjugate, an antibody-drug conjugate, a protein-drug conjugate, cells, tissues, or combinations thereof.

As used herein, an "antibody fragment" includes a portion of an intact antibody, such as, for example, the Fc region, the antigen-binding, or variable region of an antibody. Examples of antibody fragments include, but are not limited to, a Fab fragment, a Fab' fragment, a F(ab')2 fragment, a Fc fragment, a scFv fragment, a Fv fragment, a dsFv diabody, a dAb fragment, a Fd' fragment, a Fd fragment, and an isolated complementarity determining region (CDR) region, as well as triabodies, tetrabodies, linear antibodies, single-chain antibody molecules, and multi specific antibodies formed from antibody fragments. Fv fragments are the combination of the variable regions of the immunoglobulin heavy and light chains, and ScFv proteins are recombinant single chain polypeptide molecules in which immunoglobulin light and heavy chain variable regions are connected by a peptide linker. An antibody fragment may be produced by various means. For example, an antibody fragment may be enzymatically or chemically produced by fragmentation of an intact antibody and/or it may be recombinantly produced from a gene encoding the partial antibody sequence. Alternatively or additionally, an antibody fragment may be wholly or partially synthetically produced. An antibody fragment may optionally comprise a single chain antibody fragment. Alternatively or additionally, an antibody fragment may comprise multiple chains that are linked together, for example, by disulfide linkages. An antibody fragment may optionally comprise a multi-molecular complex.

As used herein, the term "antibody-drug conjugate", or "ADC" can refer to an antibody attached to biologically active drug(s) by linker(s) with labile bond(s). An ADC can comprise several molecules of a biologically active drug (or the payload) which can be covalently linked to side chains of amino acid residues of an antibody (Siler Panowski et al., Site-specific antibody drug conjugates for cancer therapy, 6 mAbs 34-45 (2013)). An antibody used for an ADC can be capable of binding with sufficient affinity for selective accumulation and durable retention at a target site. Most ADCs can have Kd values in the nanomolar range. The payload can have potency in the nanomolar/picomolar range and can be capable of reaching intracellular concentrations achievable following distribution of the ADC into target tissue. Finally, the linker that forms the connection between the payload and the antibody can be capable of being sufficiently stable in circulation to take advantage of the pharmacokinetic properties of the antibody moiety (e.g., long half-life) and to allow the payload to remain attached to the antibody as it distributes into tissues, yet should allow for efficient release of the biologically active drug once the ADC can be taken up into target cells. The linker can be those that are non-cleavable during cellular processing and those that are cleavable once the ADC has reached the target site. With non-cleavable linkers, the biologically active drug released within the cell includes the payload and all elements of the linker still attached to an amino acid residue of the antibody, typically a lysine or cysteine residue, following complete proteolytic degradation of the ADC within the lysosome. Cleavable linkers are those whose structure includes a site of cleavage between the payload and the amino acid attachment site on the antibody. Cleavage mechanisms can include hydrolysis of acid-labile bonds in acidic intracellular compartments, enzymatic cleavage of amide or ester bonds by an intracellular protease or esterase, and reductive cleavage of disulfide bonds by the reducing environment inside cells.

As used herein, an "antibody" is intended to refer to immunoglobulin molecules consisting of four polypeptide chains, two heavy (H) chains and two light (L) chains inter-connected by disulfide bonds. Each heavy chain has a heavy chain variable region (HCVR or VH) and a heavy chain constant region. The heavy chain constant region contains three domains, CH1, CH2 and CH3. Each light chain has of a light chain variable region and a light chain constant region. The light chain constant region consists of one domain (CL). The VH and VL regions can be further subdivided into regions of hypervariability, termed complementarity determining regions (CDR), interspersed with regions that are more conserved, termed framework regions (FR). Each VH and VL can be composed of three CDRs and four FRs, arranged from amino-terminus to carboxy-terminus in the following order: FR1, CDR1, FR2, CDR2, FR3, CDR3, FR4. The term "antibody" includes reference to both glycosylated and non-glycosylated immunoglobulins of any isotype or subclass. The term "antibody" is inclusive of, but not limited to, those that are prepared, expressed, created or isolated by recombinant means, such as antibodies isolated from a host cell transfected to express the antibody. An IgG comprises a subset of antibodies.

In some exemplary embodiments, the method for identifying at least one peptide or protein in a sample further comprises identifying or quantifying a level of post-translational modification or post-translational modification variation of the at least one peptide or protein based on the at least one separation profile or a comparison with another separation profile.

As used herein, the general term "post-translational modifications" or "PTMs" refer to covalent modifications that polypeptides undergo, either during (co-translational modification) or after (post-translational modification) their ribosomal synthesis. PTMs are generally introduced by specific enzymes or enzyme pathways. Many occur at the site of a specific characteristic protein sequence (signature sequence) within the protein backbone. Several hundred PTMs have been recorded, and these modifications invariably influence some aspect of a protein's structure or function (Walsh, G. "Proteins" (2014) second edition, published by Wiley and Sons, Ltd., ISBN: 9780470669853). The various post-translational modifications include, but are not limited to, cleavage, N-terminal extensions, protein degradation, acylation of the N-terminus, biotinylation (acylation of lysine residues with a biotin), amidation of the C-terminal, glycosylation, iodination, covalent attachment of prosthetic groups, acetylation (the addition of an acetyl group, usually at the N-terminus of the protein), alkylation (the addition of an alkyl group (e.g. methyl, ethyl, propyl) usually at lysine or arginine residues), methylation, adenylation, ADP-ribosylation, covalent cross links within, or between, polypeptide chains, sulfonation, prenylation, vitamin C dependent modifications (proline and lysine hydroxylations and carboxy terminal amidation), vitamin K dependent modification wherein vitamin K is a cofactor in the carboxylation of glutamic acid residues resulting in the formation of a γ-carboxyglutamate (a glu residue), glutamylation (covalent linkage of glutamic acid residues), glycylation (covalent linkage glycine residues), glycosylation (addition of a glycosyl group to either asparagine, hydroxylysine, serine, or threonine, resulting in a glycoprotein), isoprenylation (addition of an isoprenoid group such as farnesol and geranylgeraniol), lipoylation (attachment of a lipoate functionality), phosphopantetheinylation (addition of a 4'-phosphopantetheinyl moiety from coenzyme A, as in fatty acid, polyketide, non-ribosomal peptide and leucine biosynthesis), phosphorylation (addition of a phosphate group, usually to serine, tyrosine, threonine or histidine), and sulfation (addition of a sulfate group, usually to a tyrosine residue). The post-translational modifications that change the chemical nature of amino acids include, but are not limited to, citrullination (the conversion of arginine to citrulline by deimination), and deamidation (the conversion of glutamine to glutamic acid or asparagine to aspartic acid). The post-translational modifications that involve structural changes include, but are not limited to, formation of disulfide bridges (covalent linkage of two cysteine amino acids) and proteolytic cleavage (cleavage of a protein at a peptide bond). Certain post-translational modifications involve the addition of other proteins or peptides, such as ISGylation (covalent linkage to the ISG15 protein (Interferon-Stimulated Gene)), SUMOylation (covalent linkage to the SUMO protein (Small Ubiquitin-related MOdifier)) and ubiquitination (covalent linkage to the protein ubiquitin). See European Bioinformatics Institute Protein Information ResourceSIB Swiss Institute of Bioinformatics, European Bioinformatics Institute Drs—Drosomycin precursor—*Drosophila melanogaster* (Fruit fly)—Drs gene & protein, http://www.uniprot.org/docs/ptm-list (last visited Jan. 15, 2019) for a more detailed controlled vocabulary of PTMs curated by UniProt.

In some exemplary embodiments, the method for identifying at least one peptide or protein in a sample further comprises separating or identifying an impurity in the sample based on the at least one separation profile or a comparison with another separation profile. In some preferred exemplary aspects, the impurity does not contain a Fc region of the antibody. In some preferred exemplary aspects, the impurity does not provide affinity binding to the affinity-binding molecule of the at least one peptide or protein, protein A or FcγRIIIa.

As used herein, the term "impurity" can include any undesirable protein present in the protein biopharmaceutical product. In particular, the impurity does not contain a Fc region of the antibody or does not provide affinity binding to the affinity-binding molecule of the at least one peptide or protein, protein A or FcγRIIIa. Impurity can include process and product-related impurities. The impurity can further be of known structure, partially characterized, or unidentified. Process-related impurities can be derived from the manufacturing process and can include the three major categories: cell substrate-derived; cell culture-derived; and downstream derived. Cell substrate-derived impurities include, but are not limited to, proteins derived from the host organism and nucleic acid (host cell genomic, vector, or total DNA). Cell culture-derived impurities include, but are not limited to, inducers, antibiotics, serum, and other media components. Downstream-derived impurities include, but are not limited to, enzymes, chemical and biochemical processing reagents (e.g., cyanogen bromide, guanidine, oxidizing and reducing agents), inorganic salts (e.g., heavy metals, arsenic, nonmetallic ion), solvents, carriers, ligands (e.g., monoclonal antibodies), and other leachables. Product-related impurities (e.g., precursors, certain degradation products) can be molecular variants arising during manufacture and/or storage that do not have properties comparable to those of the desired product with respect to activity, efficacy, and safety. Such variants may need considerable effort in isolation and characterization in order to identify the type of modification (s). Product-related impurities can include truncated forms, modified forms, and aggregates. Truncated forms are formed by hydrolytic enzymes or chemicals which catalyze the cleavage of peptide bonds. Modified forms include, but are not limited to, deamidated, isomerized, mismatched S—S linked, oxidized, or altered conjugated forms (e.g., glycosylation, phosphorylation). Modified forms can also include any post-translational modification form. Aggregates include dimers and higher multiples of the desired product. (Q6B Specifications: Test Procedures and Acceptance Criteria for Biotechnological/Biological Products, ICH August 1999, U.S. Dept. of Health and Humans Services).

In some exemplary embodiments, in the method for identifying at least one peptide or protein in a sample, the solid surface comprising protein A is included in a chromatography column.

As used herein, the term "protein A" encompasses protein A recovered from a native source thereof, protein A produced synthetically (e.g., by peptide synthesis or by recombinant techniques), and variants thereof which retain the ability to bind proteins which have a $C_H2/C_H3$ region. Non-limiting examples of protein A commercial manufacturers include Repligen, Pharmacia and Fermatech. Protein A can be immobilized on a solid surface or a solid phase. By "solid surface" or "solid phase" is meant a non-aqueous matrix to which the protein A can adhere. The solid phase of interest herein can comprise a glass or silica surface. The solid phase may be a purification column or a discontinuous phase of discrete particles As used herein, the term "chromatography" refers to a process in which a chemical mixture carried by a liquid or gas can be separated into components as a result of differential distribution of the chemical entities as they flow around or over a stationary liquid or solid phase. Non-limiting examples of chromatography include traditional reversed-phased (RP), ion exchange (IEX), mixed mode chromatography and normal phase chromatography (NP).

In some exemplary embodiments, in the method for identifying at least one peptide or protein in a sample, the mass spectrometer is an electrospray ionization mass spectrometer, nano-electrospray ionization mass spectrometer, a triple quadrupole mass spectrometer, a quadrupole mass spectrometer or a ultra-high mass range hybrid quadrupole mass spectrometer.

As used herein, the term "electrospray ionization" or "ESI" refers to the process of spray ionization in which either cations or anions in solution are transferred to the gas phase via formation and desolvation at atmospheric pressure of a stream of highly charged droplets that result from applying a potential difference between the tip of the electrospray needle containing the solution and a counter electrode. There are generally three major steps in the production of gas-phase ions from electrolyte ions in solution. These are: (a) production of charged droplets at the ES infusion tip; (b) shrinkage of charged droplets by solvent evaporation and repeated droplet disintegrations leading to small highly charged droplets capable of producing gas-phase ions; and (c) the mechanism by which gas-phase ions are produced from very small and highly charged droplets. Stages (a)-(c) generally occur in the atmospheric pressure region of the apparatus.

As used herein, the term "nano-electrospray" refers to electrospray ionization at a very low solvent flow rate, typically hundreds of nanoliters per minute of sample solution or lower, often without the use of an external solvent delivery. The electrospray infusion setup forming a nano-electrospray can use a static nanoelectrospray emitter or a dynamic nanoelectrospray emitter. A static nanoelectrospray emitter performs a continuous analysis of small sample (analyte) solution volumes over an extended period of time. A dynamic nanoelectrospray emitter uses a capillary column and a solvent delivery system to perform chromatographic separations on mixtures prior to analysis by the mass spectrometer.

In some exemplary aspects, in the method for identifying at least one peptide or protein in a sample, the mass spectrometer comprises an orbitrap mass analyzer.

As used herein, the term "mass analyzer" includes a device that can separate species, that is, atoms, molecules, or clusters, according to their mass. Non-limiting examples of mass analyzers that could be employed for fast protein sequencing are time-of-flight (TOF), magnetic electric sector, quadrupole mass filter (Q), quadrupole ion trap (QIT), orbitrap, Fourier transform ion cyclotron resonance (FTICR), and also the technique of accelerator mass spectrometry (AMS).

EXEMPLARY EMBODIMENTS

Embodiments disclosed herein provide compositions, methods, and systems for identifying at least one peptide or protein in a sample based on affinity chromatography-coupled native mass spectrometry.

In some exemplary embodiments, the disclosure provides a method for identifying at least one peptide or protein in a sample, comprising: contacting the sample to a solid surface, wherein the solid surface comprises an affinity-binding molecule of the at least one peptide or protein; washing the solid surface using a mobile phase to produce at least one eluent, wherein the eluent comprises the at least one peptide or protein; and characterizing the at least one peptide or protein in the at least one eluent using a mass spectrometer under native condition. In some exemplary aspects, the disclosure provides a system for identifying at least one peptide or protein, comprising: a sample comprising the at least one peptide or protein; a chromatography column comprising an affinity-binging molecule of the at least one peptide or protein, wherein the chromatography column is capable of being washed by a mobile phase to generate an eluent; a mass spectrometer capable of characterizing or quantifying the at least one peptide or protein, wherein the mass spectrometer is capable of being run under native condition, and being coupled online to the chromatography column.

In some exemplary aspects, in the method or system for identifying at least one peptide or protein in a sample, the mobile phase comprises an alkaline solution, an acid solution, or a combination thereof. In some embodiments, the alkaline solution has a pH value of about pH 5.0-9.0, about pH 6.0-8.0, about pH 6.5-7.5, preferable about pH 6.5 or preferable about pH 7.0. In some aspects, the acidic solution has pH value of about pH 1.0-4.6, about pH 2.0-4.6, about pH 2.5-3.5, preferable about pH 4.5 or preferable about pH 3.0.

In some exemplary embodiments, the method or system for identifying at least one peptide or protein in a sample is based on FcγRIIIa chromatography-coupled native mass spectrometry, wherein a FcγRIIIa chromatography column is coupled online to a native mass spectrometer, wherein a splitter is used to connect the mass spectrometer and the chromatography column. For conducting FcγRIIIa chromatography, a HPLC (high performance liquid chromatography) equipped with a FcγRIIIa column is used for frontend separations. Mass spectrometry compatible mobile phases containing ammonium acetate (about pH 5.0-9.0, about pH 6.0-8.0, about pH 6.0-7.5, or preferable about pH 6.5) and/or ammonium acetate (about pH 1.0-5.0, about pH 2.0-5.0, about pH 2.5-5.0, or preferable about pH 4.5) are used for FcγRIIIa applications. In some exemplary aspects, the concentration of ammonium acetate is about 50-200 mM, about 100-200 mM, about 120-170 mM or preferable about 150 mM.

In some exemplary embodiments, the method or system for identifying at least one peptide or protein in a sample is based on protein A chromatography-coupled native mass spectrometry, wherein a protein A chromatography column is coupled online to a native mass spectrometer, wherein a splitter is used to connect the mass spectrometer and the chromatography column. For conducting protein A chromatography, a HPLC equipped with a protein A column is used for frontend separations. Mass spectrometry compatible mobile phases containing ammonium acetate (about pH 5.0-9.0, about pH 6.0-8.0, about pH 6.5-7.5 or preferable about pH 7.0) and/or acetic acid (about pH 1.0-4.0, about pH 2.0-4.0, about pH 2.5-3.5, or preferable about pH 3.0) are used for protein A applications. In some exemplary embodiment, the concentration of ammonium acetate or acetic acid is about 50-200 mM, about 100-200 mM, about 120-170 mM or preferable about 150 mM.

In some exemplary embodiments, the mass spectrometry has an orbitrap mass analyzer and uses electrospray ionization (ESI). In some exemplary aspects, the mobile phase for washing the affinity column has a flow rate of about 0.1-0.8 mL/min, about 0.2-0.6 mL/min, about 0.3-0.5 mL/min, or preferable about 0.4 mL/min. A post-column splitter is used to divert low flow (ID. 25 μm), such as a flow rate of 0.5-3 μL/min, or preferable about 1-2 μL/min, to the mass spectrometer which is equipped with a nanospray ion source. The high flow, such as a flow rate of about 0.3-0.5 mL/min, or preferable about 0.4 mL/min, is diverted to a diode-array detector (DAD) or a photodiode array detector (PDA), for monitoring the separation at 280 nm and an in-line pH monitor for tracking the pH range of elution.

It is understood that the method or system of the present application is not limited to any of the aforesaid pharmaceutical products, peptides, proteins, antibodies, antibody-drug conjugates, biopharmaceutical products, chromatography column, or mass spectrometer.

The consecutive labeling of method steps as provided herein with numbers and/or letters is not meant to limit the method or any embodiments thereof to the particular indicated order Various publications, including patents, patent applications, published patent applications, accession numbers, technical articles and scholarly articles are cited throughout the specification. Each of these cited references is incorporated by reference, in its entirety and for all purposes, herein.

The disclosure will be more fully understood by reference to the following Examples, which are provided to describe the disclosure in greater detail. They are intended to illustrate and should not be construed as limiting the scope of the disclosure.

EXAMPLES

Material and Reagent Preparation.
1.1 Antibody Reference Material

NISTmAb was used as antibody reference material. The NISTmAb is a recombinant humanized IgG1κ expressed in murine suspension culture, which is a homodimer of two identical light chains and two identical heavy chains. The NISTmAb has low abundance post-translational modifications including methionine oxidation, deamidation, and glycation. The heavy chains of the NISTmAb have N-terminal pyroglutamination, C-terminal lysine clipping, and glycosylation. The NISTmAb has been extensively characterized and was produced in murine suspension cell culture undergone industry standard upstream and downstream purification to remove process related impurities.

2.1 Bispecific Antibodies and their Parental Monospecific Antibodies

Bispecific antibodies and their parental monospecific antibodies were subjected to characterizations or purification.

As shown in FIG. 1B, MAB1 (Fc/Fc*; Fc* indicates star-substitution) was derived by combining a single heavy chain from MAB2 (Fc*/Fc*) and a single heavy chain from MAB3 (Fc/Fc) (Tustian et al., mAbs, vol 8, No 4, pages 828-838, 2016, Development of purification processes for fully human bispecific antibodies based upon modification of protein A binding avidity). The format of a bispecific antibody includes pairing two different heavy chains with two common light chains, which enables two unique antigen-binding sites targeting two different antigens. For example, MAB1 (HH*L2, FcFc*) is a bispecific antibody targeting both ANTIGENA and ANTIGENB. The parental monospecific antibody MAB2 (H*2L2, Fc*Fc*) targeting ANTIGENA has two heavy chains which are both modified by a two amino acid substitution. The parental monospecific antibody MAB3 (H2L2, FcFc) targeting ANTIGENB does not have amino acid substitutions on its heavy chains. The ANTIGENA arm in heavy chains of bispecific antibody MAB1 has a two amino acid substitution. Substitutions of two amino acids in the Fc regions of the heavy chains of MAB2 abrogate protein A binding, for example, substituted HY with RF referred as star-substitution or Fc*. This star-substitution contributes to the difference in the binding to protein A, which may facilitate the antibody purification or separation among the bispecific antibody and its parental monospecific antibodies based on protein A affinity chromatography.

Figure 2A:
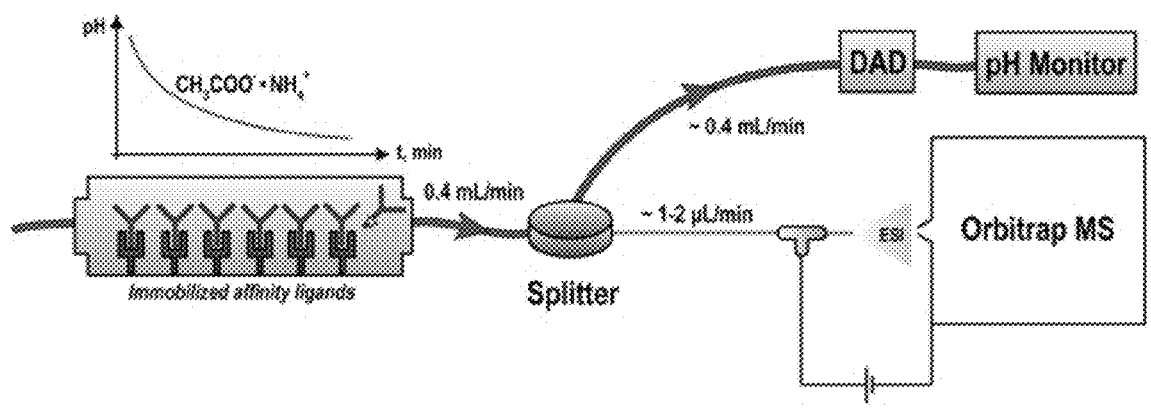
FIG. 2A shows a system, wherein a mass spectrometer is coupled online to an affinity-based chromatography column, wherein a splitter is used to connect the mass spectrometer and the affinity-based chromatography column according to an exemplary embodiment.

Instrument and Workflow for Identification of Peptides or Proteins 1.1. Affinity-Based Chromatography-Coupled Native Mass Spectrometry The present application provides affinity-based chromatography-coupled native mass spectrometry methods and systems, wherein an affinity-based chromatography column was coupled online to a native mass spectrometer, wherein a splitter is used to connect the mass spectrometer and the affinity-based chromatography column as shown in FIG. 2A according to an exemplary embodiment. The mass spectrometry analysis in the method or system was conducted under native conditions.

For conducting affinity-based chromatography, such as a protein A chromatography column, a Dionex Ultimate 3000 HPLC (high performance liquid chromatography, Thermo Fisher Scientific, Waltham, MA) equipped with an Bio-Monolith Protein A column (Agilent Technologies, Inc, Santa Clara, CA) was used for frontend separations according to an exemplary embodiment. For conducting FcγRIIIa affinity chromatography, TSKgel FcγRIIIa column (Tosoh Biosciences LLC) including a Dionex Ultimate 3000 HPLC was used. The mobile phase A is 150 mM ammonium acetate at pH 6.5 and the mobile phase B is 150 mM ammonium acetate at pH 4.5 with flow rate of 0.4 mL/min in the combining systems of TSKgel FcγRIIIa column and native mass spectrometer.

Figure 2B:
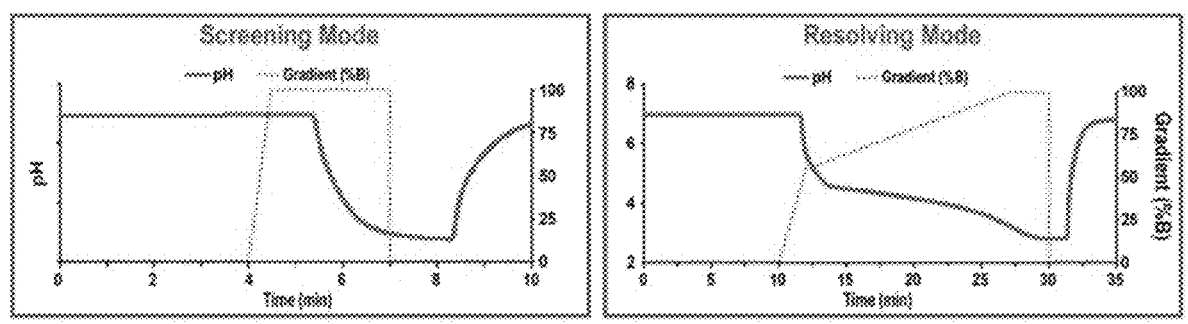
FIG. 2B shows the pH ranges and profiles during the separation, such as the screening mode and the resolving mode, according to an exemplary embodiment. Mass spectrometry compatible mobile phases containing ammonium acetate and/or acetic acid were used for the separation according to an exemplary embodiment.

For conducting native mass spectrometry, a Thermo Scientific™ Q-Exactive™ UHMR (ultrahigh mass range) mass spectrometer was used. The mass spectrometer has an orbitrap mass analyzer and uses electrospray ionization (ESI) as show in FIG. 2A. Mass spectrometry compatible mobile phases containing ammonium acetate (such as at about 150 mM about pH 7.0) and/or acetic acid (at about 150 mM about pH 3.0) were used for protein A applications as shown in FIG. 2B. As an example, the variations in pH ranges and pH profiles of the mobile phases are shown in FIG. 2B regarding the screening mode (rapid) and the resolving mode (longer). The mobile phase which was used to wash the column had a flow rate of about 0.2-0.6 mL/min, such as about 0.4 mL/min. A post-column splitter was used to divert low flow (a flow rate of about 1-2 µL/min, I.D. 25 µm) to the mass spectrometer, which was equipped with a Nanospray Flex™ Ion Source which allowed achieving the sensitivity and dissolvation of nanospray ionization source. The high flow (a flow rate of about 0.4 mL/min) was diverted to a diode-array detector (DAD), such as a photodiode array detector (PDA), for monitoring the separation at 280 nm and an in-line pH monitor for tracking the pH range of elution. Raw mass spectrometry spectral data were deconvoluted using INTACT MASS™ software from Protein Metrics.

Example 1. Screening of NISTmAb Using ProA-MS

The methods and systems of protein A chromatography-coupled native mass spectrometry (ProA-MS) of the present application were used to identify and screen NISTmAb. The analysis using mass spectrometer was performed under native conditions. A mass spectrometer was coupled online to a protein A chromatography column, wherein a splitter was used to connect the mass spectrometer and the chromatography column as shown in FIG. 2A and as described in the instrument and workflow sections. For conducting protein A chromatography, a HPLC equipped with a protein A column was used for frontend separations. Mass spectrometry compatible mobile phases containing ammonium acetate (about pH 7.0) and acetic acid (about pH 3.0) were used for protein A separation to generate eluents containing NISTmAb which were subsequently subjected to native mass spectrometry analysis. The mobile phase which was used to wash the protein A column had a flow rate of about 0.4 mL/min. NISTmAb reference material was separated and screened with the rapid high-throughput analytic method of the present application. The eluents from protein A column were subjected to the native mass spectrometry analysis without sample pre-treatment.

Figure 3A:
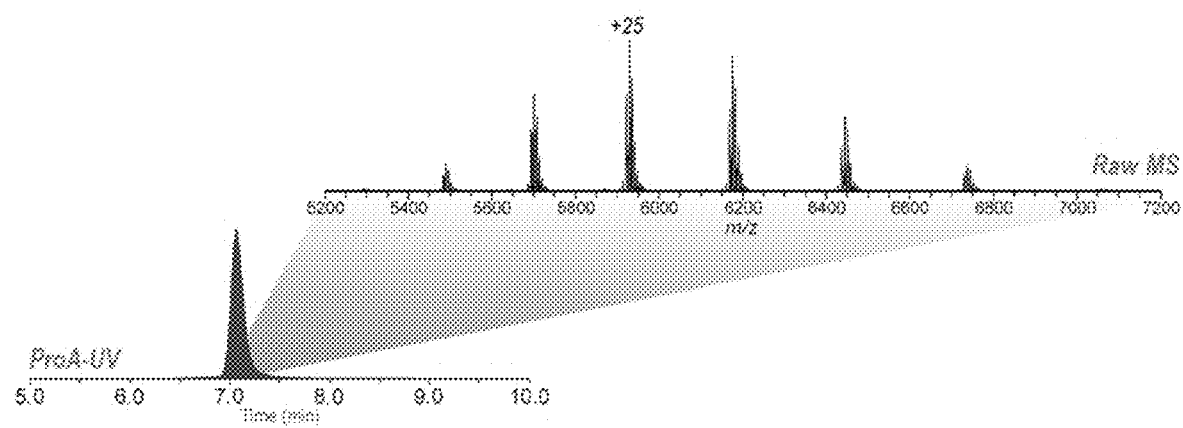
FIG. 3A shows the raw mass spectrometry data of screening NISTmAb reference material using rapid pH gradient elution without sample pre-treatment according to an exemplary embodiment.
Figure 3B:
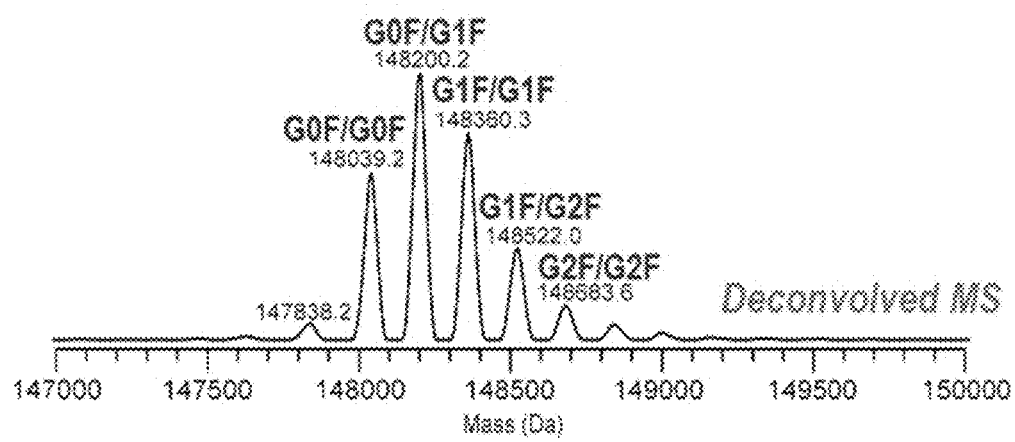
FIG. 3B shows the raw mass spectrometry spectral data which were deconvoluted using INTACT MASS™ software according to an exemplary embodiment. The variations of post-translational modifications of NISTmAb were characterized according to an exemplary embodiment.

Fast screening of NISTmAb reference material with baseline resolution of glycoforms and accurate mass measurement was accomplished using rapid pH gradient elution without sample pre-treatment. The raw mass spectrometry data is shown in FIG. 3A. The raw mass spectrometry spectral data were deconvoluted using INTACT MASS™ software as shown in FIG. 3B. NISTmAb is a recombinant humanized IgG1κ expressed in murine suspension culture, which has low abundance post-translational modifications including methionine oxidation, deamidation, and glycation. In addition, the heavy chains of the NISTmAb have N-terminal pyroglutamination, C-terminal lysine clipping, and glycosylation. The variations of post-translational modifications and glycosylations of NISTmAb were well characterized with baseline resolution as shown in FIG. 3B. Despite the acidic conditions were required for elution from the protein A column, native-like charge states of the NISTmAb were maintained across the elution profile which indicated negligible sample denaturation using the method and system of the present application.

Example 2. Evaluating Antibody Variants Under Oxidative Stress Using ProA-MS

Figure 4:
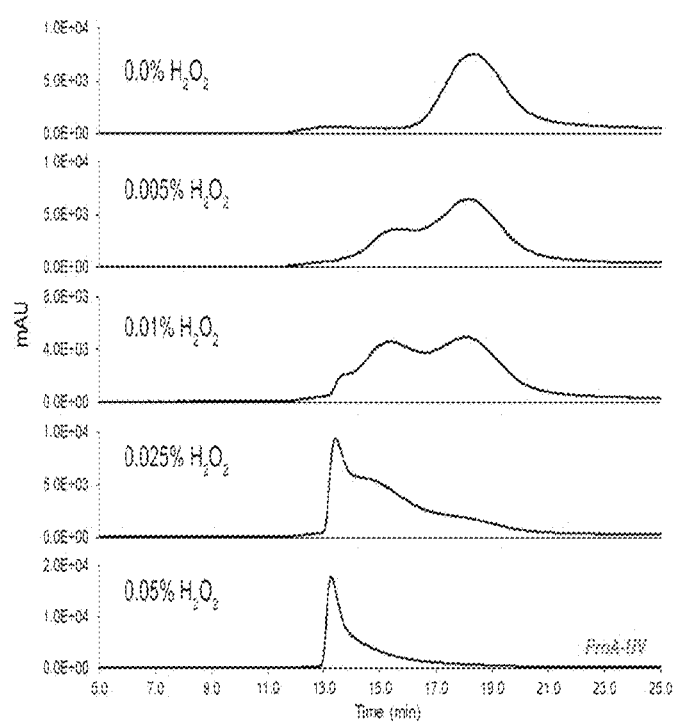
FIG. 4 shows the results of evaluating variants of NISTmAb under oxidative stress in the presence of about 0.005%-0.05% (v/v) hydrogen peroxide ($H_2O_2$) according to an exemplary embodiment. Treated NISTmAb was subsequently analyzed by protein A chromatography-coupled native mass spectrometry method and system of the present application according to an exemplary embodiment.
Figure 4:
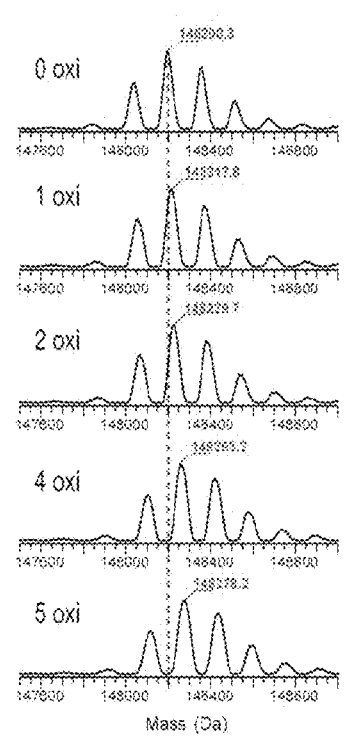

The NISTmAb was subjected to increasing levels of oxidative stress in the presence of about 0.005%-0.05% (v/v) hydrogen peroxide ($H_2O_2$) and subsequently analyzed by ProA-MS of the present application. A stepwise reduction in protein A affinity was observed as a function of increasing oxidative stress, for example, increasing concentrations of hydrogen peroxide, as shown in FIG. 4. Partial separation of oxidized variants was achieved based on differential protein A affinity binding. The identification of oxidized antibody variants in treated NISTmAb was achieved due to high spectral quality and accurate mass measurement as demonstrated in the associated deconvolved mass spectra, as shown in FIG. 4.

Figure 5:
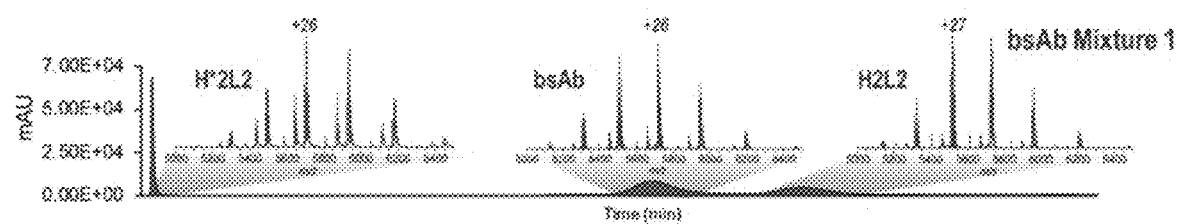
FIG. 5 shows the results of separating and identifying the components in mixtures containing a bispecific antibody and its parental monospecific antibodies using protein A chromatography-coupled native mass spectrometry methods and systems of the present application according to an exemplary embodiment.
Figure 5:
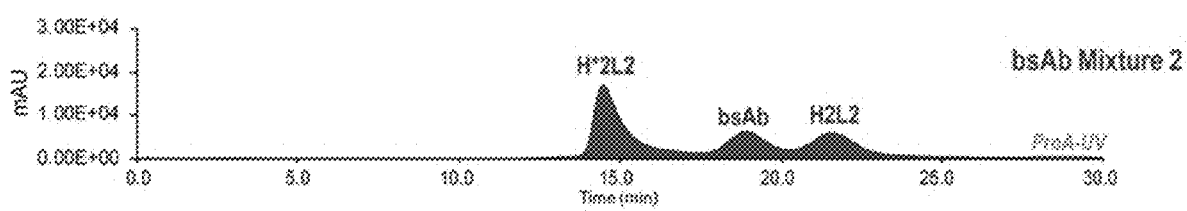
Figure 5:
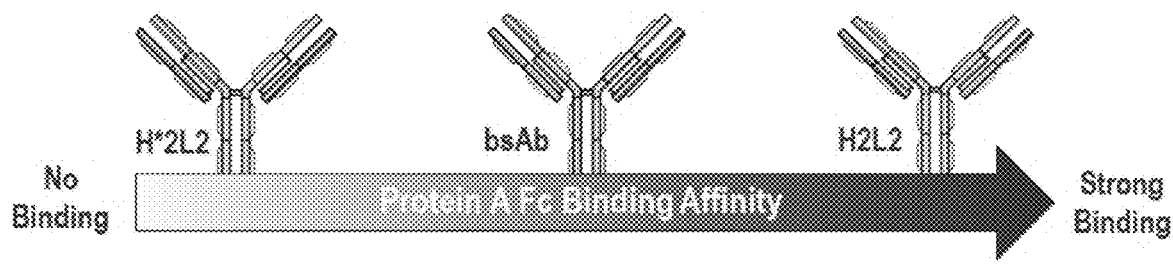

Example 3. Detecting Bispecific Antibody and its Parental Monospecific Antibodies Using ProA-MS The ProA-MS of the present application were used to separate and identify the components in mixtures containing a bispecific antibody and its parental monospecific antibodies as shown in FIG. 5. A bispecific antibody and its parental monospecific antibodies were subjected to characterization. The format of a bispecific antibody includes pairing two different heavy chains with two common light chains, which enables two unique antigen-binding sites targeting two different antigens. As shown in FIG. 5, a bispecific antibody (bsAb, H*HL2) targeting two different antigens is derived by combining a single heavy chain with a star-substitution (H*) from a parental monospecific antibody H*2L2 and a single heavy chain without a star-substitution (H) from a parental monospecific antibody H2L2. Substitutions of two amino acids, referred as star-substitution, in the Fc regions of the heavy chains of the parental monospecific antibody H*2L2 abrogate protein A binding. The parental monospecific antibody H2L2 which does not have any star-substitution has strongest binding to protein A among the antibodies in the mixtures.

Since the star-substitution contributes to the difference in the binding to protein A, it facilitates the antibody purification or separation among the bispecific antibody and its parental monospecific antibodies based on protein A affinity chromatography. Due to the presence of the star-substitutions, H*2L2 showed no binding to protein A column. As shown in FIG. 5, the protein A chromatography-coupled native mass spectrometry methods and systems of the present application were used to monitor a mixture (bsAb mixture 1) of bispecific molecules and corresponding monospecific antibodies based on their differential protein A affinity binding. However, under certain conditions, the H*2L2 showed some affinity to protein A based on its later elution time, which could likely be due to non-specific interactions between the Fab region and the protein A stationary phase, as shown in FIG. 5 for the analysis of bsAb mixture 2. Therefore, the methods and systems of the present application allowed the rapid screening of undesirable Fab binding which interfered with protein A based purification of the bispecific antibody. The methods and systems of the present application provided sensitive high-throughput analytical tools to characterize the impact of different amino acid modifications of the therapeutic monoclonal antibodies, when protein A is used to purify the therapeutic monoclonal antibodies. The methods and systems of the present application were used to separate or identify impurities in a sample with satisfactory results during protein A based purification for purifying a bispecific antibody based on differential protein A affinity binding.

Example 4. Characterizing Lysine-Linked Antibody-Drug Conjugates Using ProA-MS

ProA-MS of the present application was used to characterize antibody-drug conjugates (ADC). Lysine-linked ADC was subjected to the characterization and identification of drug-to-antibody ratio (DAR). Native SEC-MS (size exclusion chromatography mass spectrometry) and RPLC-MS (reverse phase liquid chromatography mass spectrometry) were conducted side by side as comparisons.

Figure 6:
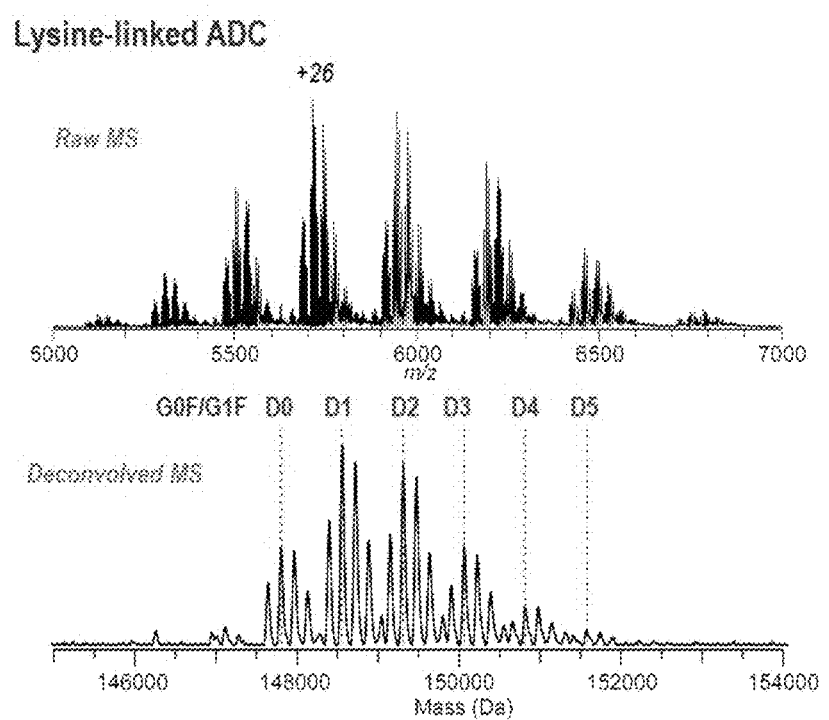
FIG. 6 shows the results of characterizing the drug-to-antibody ratio (DAR) of the lysine-linked antibody-drug conjugates using protein A chromatography-coupled native mass spectrometry methods and systems of the present application according to an exemplary embodiment. The upper figure shows the raw mass spectrum. The lower figure shows the deconvoluted mass spectrum.
Figure 7:
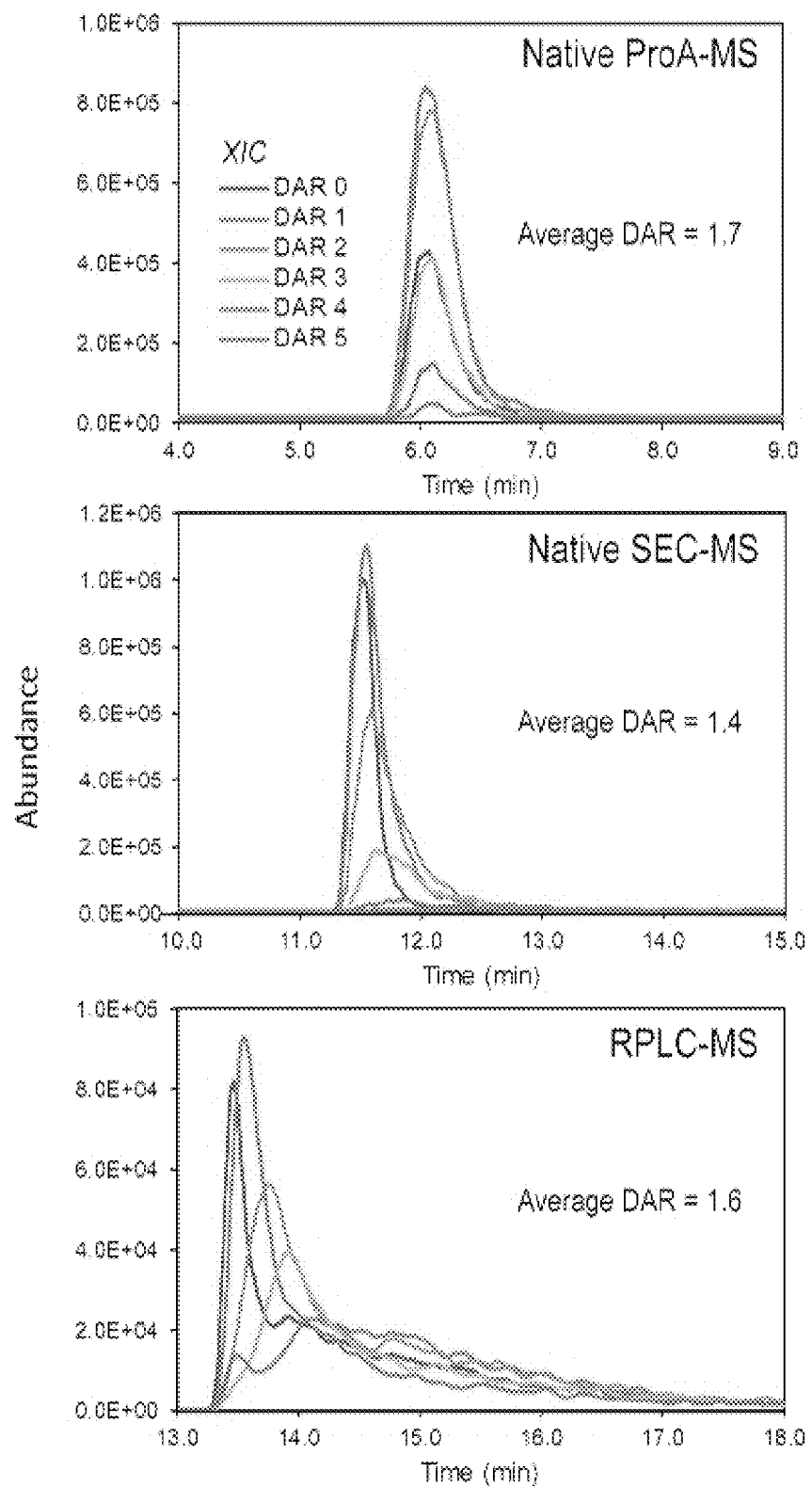
FIG. 7 shows the side-by-side comparisons of characterizing the drug-to-antibody ratio (DAR) of lysine-linked antibody-drug conjugates using the protein A chromatography-coupled native mass spectrometry methods and systems of the present application, native SEC-MS (size exclusion chromatography mass spectrometry), and RPLC-MS (reverse phase liquid chromatography mass spectrometry) according to an exemplary embodiment. The comparisons were demonstrated by the corresponding extracted ion chromatograms (XICs) according to an exemplary embodiment.

As shown in FIG. 6, the fast online protein A separation of a lysine-linked ADC exhibited uniform elution profiles across all DAR species using ProA-MS. The upper figure shows the raw mass spectrum. The lower figure shows the deconvoluted mass spectrum. In contrast, as shown in FIG. 7, the analysis results of both native SEC-MS and native RPLC-MS showed shifting retention times for species with higher DAR, as well as more extensive peak tailing compared to the native ProA-MS analysis as demonstrated by the corresponding extracted ion chromatograms (XICs). These results suggest that the ProA-MS method provided more reliable quantitation of the average DAR. Native ProA-MS showed improved sensitivity for species with higher DAR in comparison to both native SEC-MS and native RPLC-MS.

Figure 8:
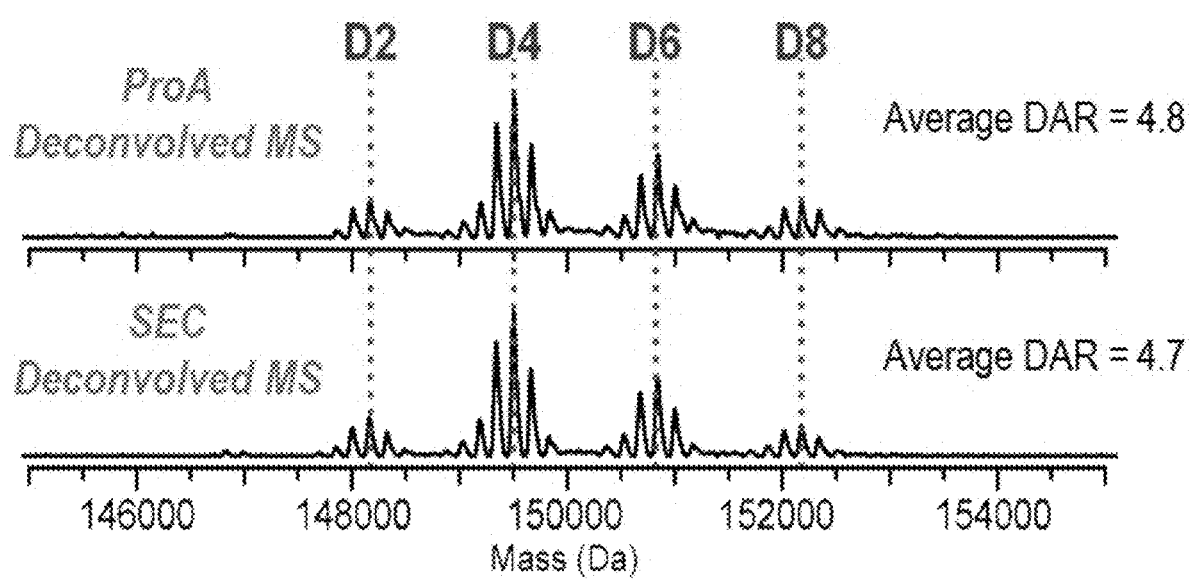
FIG. 8 shows the results of characterizing the drug-to-antibody ratio (DAR) of cysteine-linked antibody-drug conjugates using the protein A chromatography-coupled native mass spectrometry methods and systems of the present application and SEC-MS (size exclusion chromatography mass spectrometry) according to an exemplary embodiment.
Figure 9:
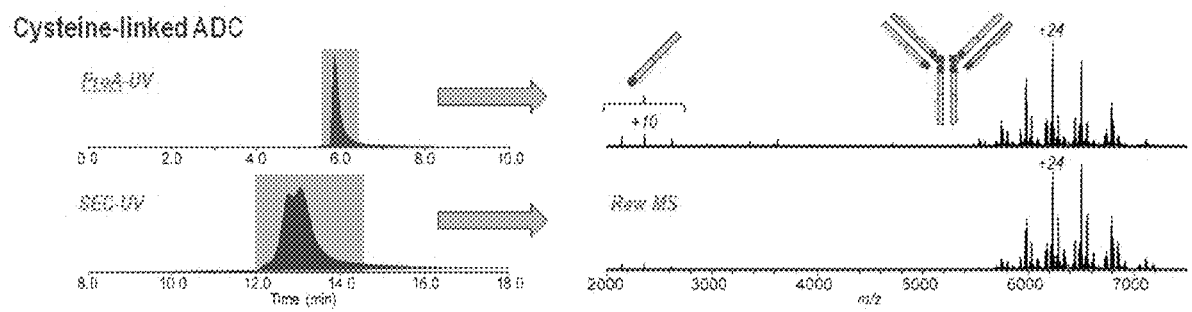
FIG. 9 shows the results of characterizing cysteine-linked antibody-drug conjugates using the protein A chromatography-coupled native mass spectrometry methods and systems of the present application and SEC-MS (size exclusion chromatography mass spectrometry) regarding released light-chain according to an exemplary embodiment.

Example 5. Characterizing Cysteine-Linked Antibody-Drug Conjugates Using ProA-MS ProA-MS of the present application was used to characterize antibody-drug conjugates (ADC). Cysteine-linked ADC was subjected to the characterization and identification of drug-to-antibody ratio (DAR). SEC-MS (size exclusion chromatography mass spectrometry) was conducted side by side as comparisons. As shown in FIG. 8, improved elution profile across all DAR species was observed for protein A based separation in comparison to SEC based separation. The average DAR values calculated by native ProA-MS and native SEC-MS were highly consistent. As shown in FIG. 9, native ProA-MS showed marginally higher levels of released light-chain compared to SEC-MS, likely due to low pH elution from protein A column.

Example 6. Online Enrichment and Direct Analysis Using ProA-MS

Figure 10:
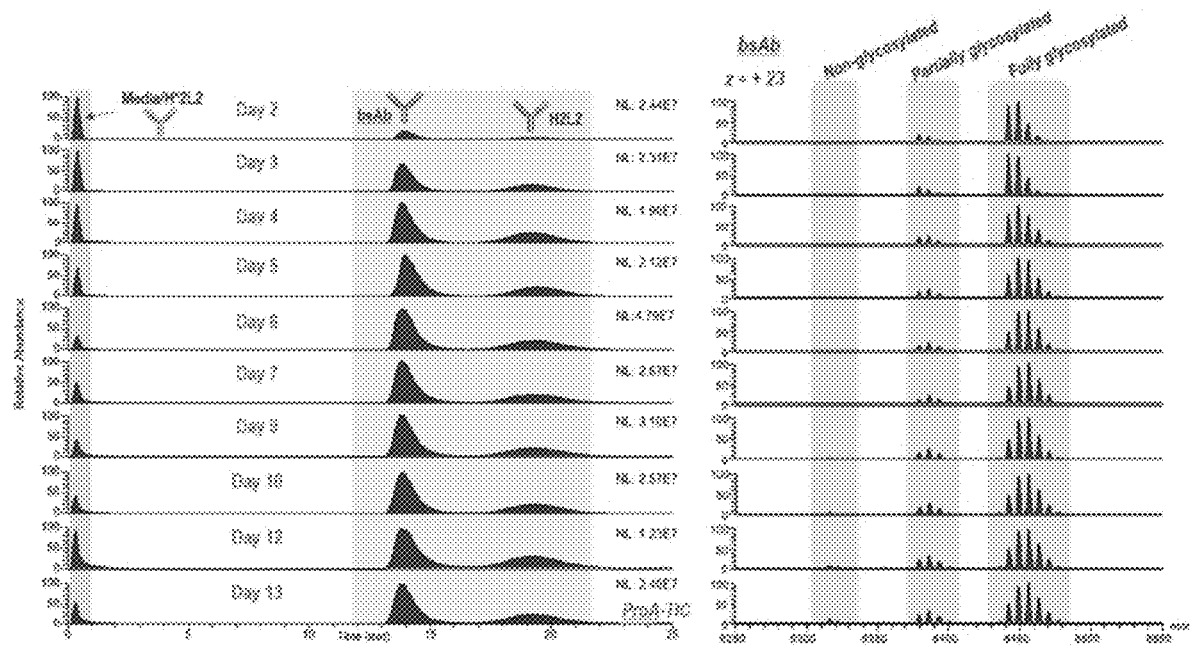
FIG. 10 shows the detection of MAB4 in cell culture time course samples using protein A chromatography-coupled native mass spectrometry (ProA-MS) of the present application according to an exemplary embodiment.
Figure 11:
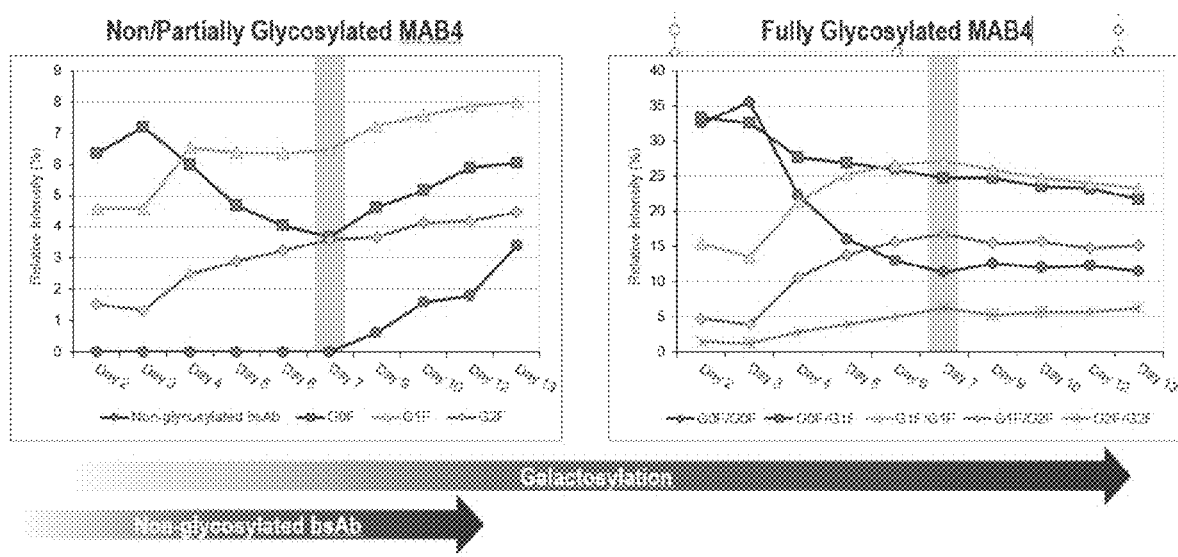
FIG. 11 shows the results of analyzing cell culture time course samples containing MAB4 regarding the changes of glycoforms across the cell culture cycle using ProA-MS of the present application according to an exemplary embodiment.

Cell culture time course samples containing MAB4 were analyzed using ProA-MS of the present application, wherein MAB4 is a bispecific monoclonal antibody (e.g., Fc/Fc*; HH*L2; Fc* indicates star-substitution). The cell culture time course samples were spun down at 14,000×g for 5 minutes and loaded directly into injection vials. The ProA-MS was set to resolving mode. MAB4 was analyzed directly using online enrichment in complex matrices. As shown in FIG. 10, relative abundance of MAB4 to media background increased as a function of time during the separation. MAB4 was able to be enriched and detected directly from cell culture media with the MAB4 titer as low as about 0.005 mg/mL. The H2L2 parental monoclonal antibody has strong affinity to protein A. The H*2L2 parental monoclonal antibody has demolished affinity. The HH*L2 bispecific monoclonal antibody has moderate affinity. In addition, the levels of non-glycosylated MAB4 were increased over time. Furthermore, the changes of glycoforms in MAB4 samples across the cell culture cycle were evaluated as shown in FIG. 11. The results indicate that the ProA-MS of the present application can facilitate online enrichment and direct analysis of low abundance monoclonal antibodies in complex matrices.

Figure 12:
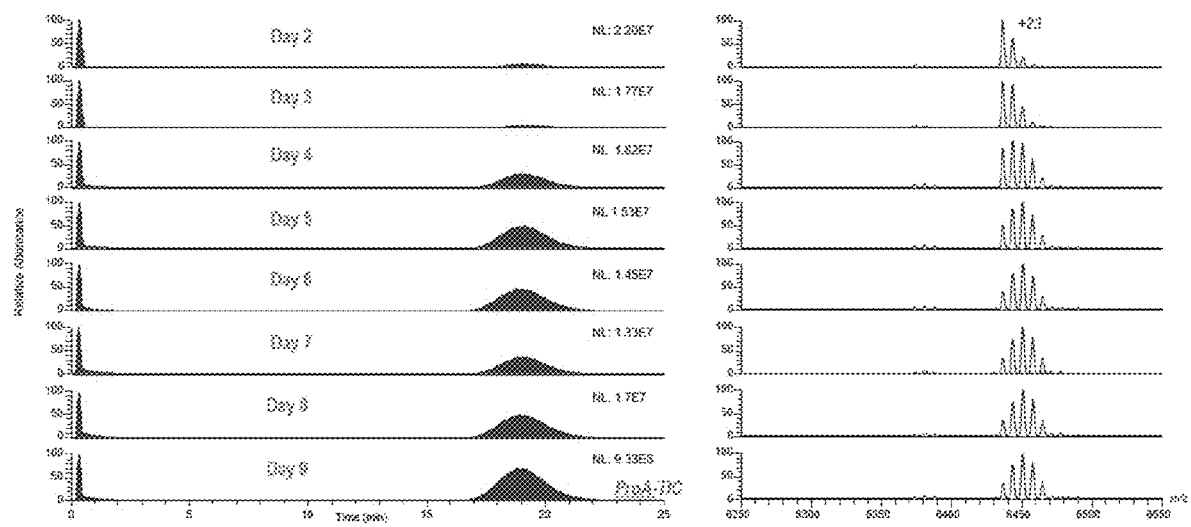
FIG. 12 shows the detection of MAB5 in cell culture time course samples using ProA-MS of the present application according to an exemplary embodiment.
Figure 13:
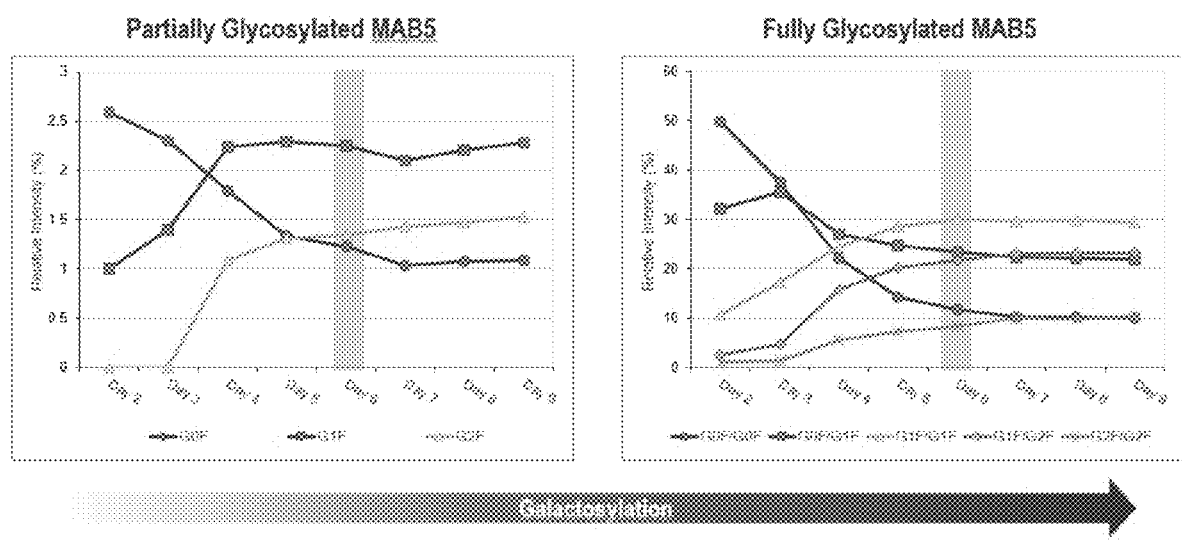
FIG. 13 shows the results of analyzing cell culture time course samples containing MAB5 regarding the changes of glycoforms across the cell culture cycle using ProA-MS of the present application according to an exemplary embodiment.

Cell culture time course samples containing MAB5 were analyzed using ProA-MS of the present application as shown in FIG. 12, wherein MAB5 is a monospecific monoclonal antibody. The cell culture time course samples were spun down at 14,000×g for 5 minutes and loaded directly into injection vials. The ProA-MS was set to resolving mode. MAB5 was analyzed directly using online enrichment in complex matrices. In addition, the changes of glycoforms in MAB5 samples across the cell culture cycle were evaluated as shown in FIG. 13.

Example 7. Screening of NISTmAb Using FcγRIIIa-MS

The methods and systems of FcγRIIIa chromatography-coupled native mass spectrometry (FcγRIIIa-MS) of the present application were used to identify and screen NISTmAb. The analysis using mass spectrometer was performed under native conditions. A mass spectrometer was coupled online to a FcγRIIIa chromatography column, wherein a splitter was used to connect the mass spectrometer and the chromatography column as shown in FIG. 2A and as described in the instrument and workflow sections. For conducting FcγRIIIa chromatography, a HPLC equipped with a TSKgel FcγRIIIa column was used for frontend separations. Mass spectrometry compatible mobile phase A containing 150 mM ammonium acetate (about pH 6.5) and mobile phase B containing 150 mM ammonium acetate (about pH 4.5) were used for FcγRIIIa separation to generate eluents containing NISTmAb which were subsequently subjected to native mass spectrometry analysis. The mobile phase which was used to wash the FcγRIIIa column had a flow rate of about 0.4 mL/min. NISTmAb reference material was separated and screened with the rapid high-throughput analytic method of the present application.

Figure 14:
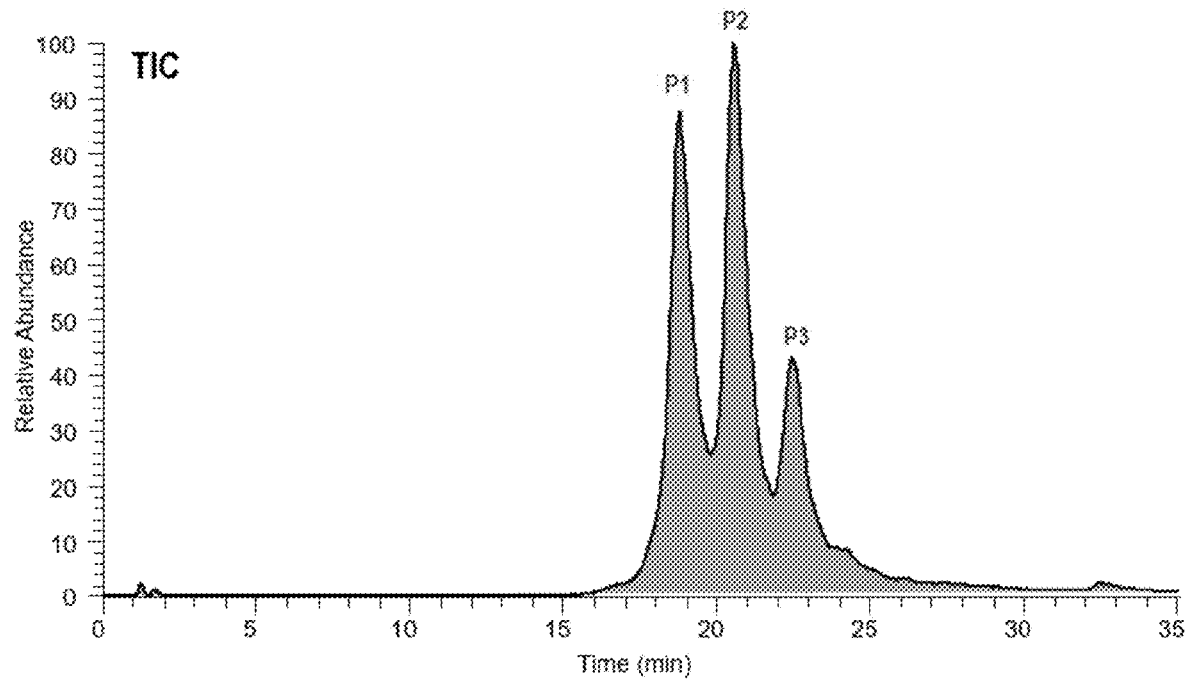
FIG. 14 shows fast screening of NISTmAb reference material with baseline resolution of glycoforms and accurate mass measurement using the methods and systems of FcγRIIIa chromatography-coupled native mass spectrometry (FcγRIIIa-MS) of the present application according to an exemplary embodiment.
Figure 14:
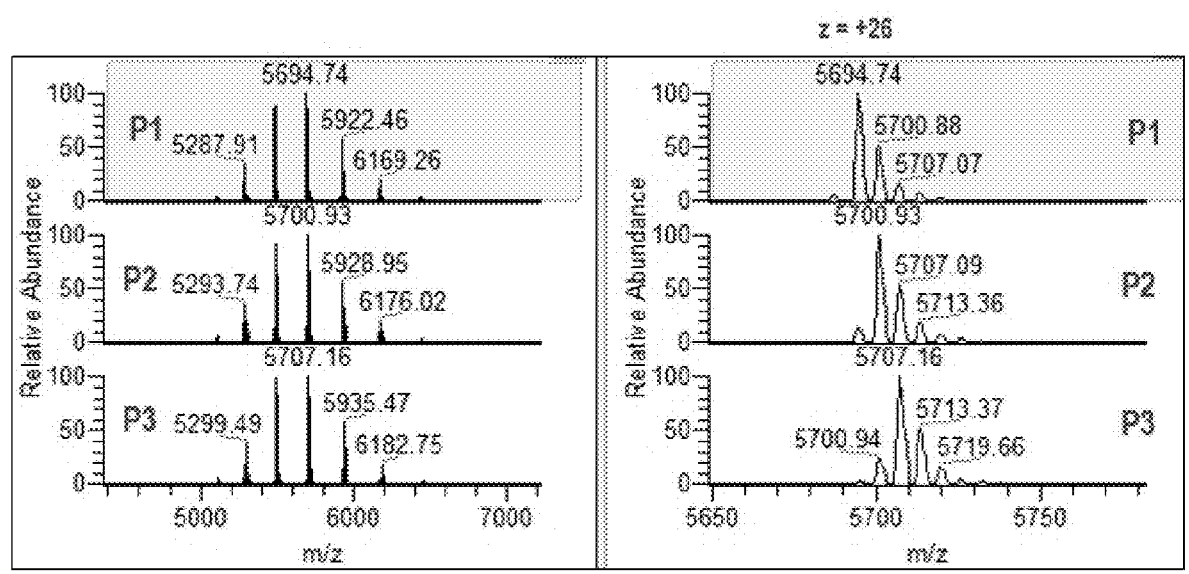

Fast screening of NISTmAb reference material with baseline resolution of glycoforms and accurate mass measurement was accomplished. Good resolution was achieved with liquid chromatography. Exceptional quality of MS data was obtained as shown in FIG. 14. The variations of post-translational modifications and glycosylations of NISTmAb were well characterized with baseline resolution as shown in FIG. 14.

Example 8. Ranking Binding Affinities of IgGs Using FcγRIIIa-MS

Figure 15:
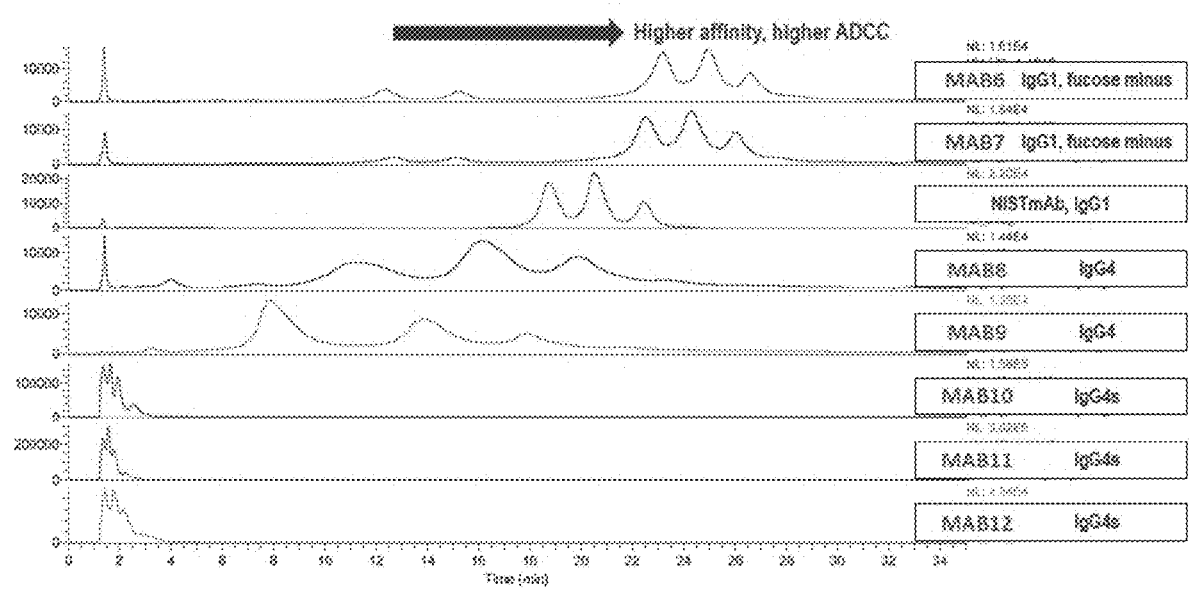
FIG. 15 shows quantitation of FcγRIIIa-MS binding affinity of various IgG formats by relative retention time according to an exemplary embodiment.

FcγRIIIa-MS of the present application was used to quantitate the binding affinity of various IgG formats by relative retention time. The results indicate that IgG4 showed weaker FcγRIIIa affinity in comparing to IgG1, IgG4 stealth (IgG4s) format showed further decreased FcγRIIIa affinity and IgG1 without core fucose exhibited the strongest FcγRIIIa affinity as shown in FIG. 15.

Example 9. Impacts of Terminal Galactose

Figure 16:
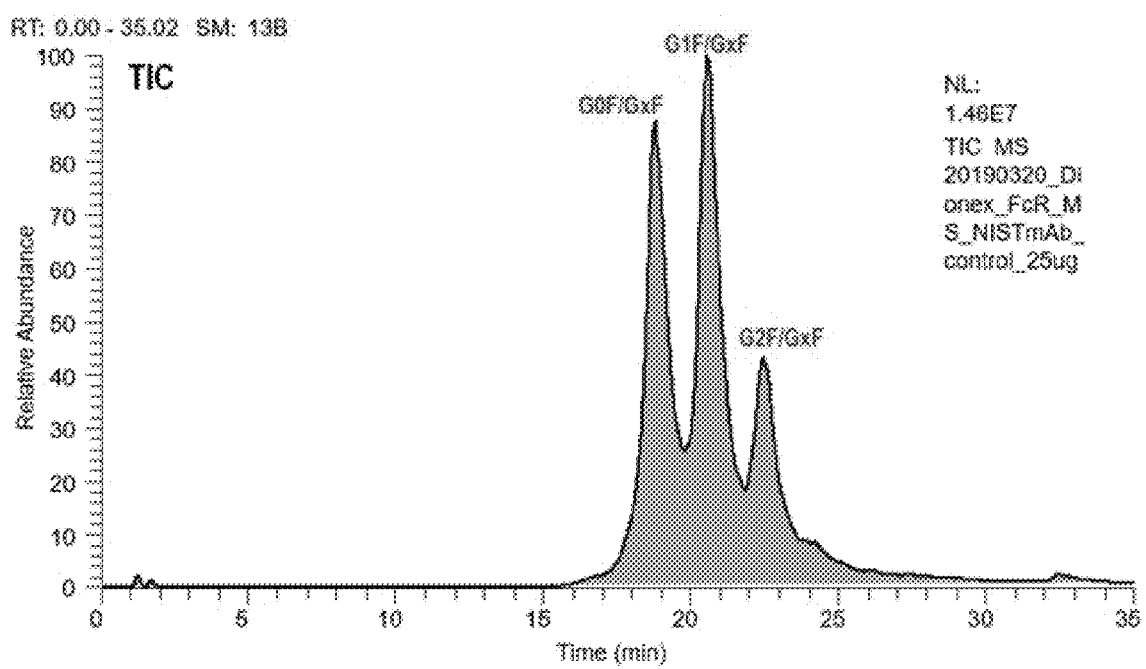
FIG. 16 shows the analysis of NISTmAb using the FcγRIIIa-MS of the present application to determine the impacts of terminal galactose affecting FcγRIIIa binding according to an exemplary embodiment.
Figure 16:
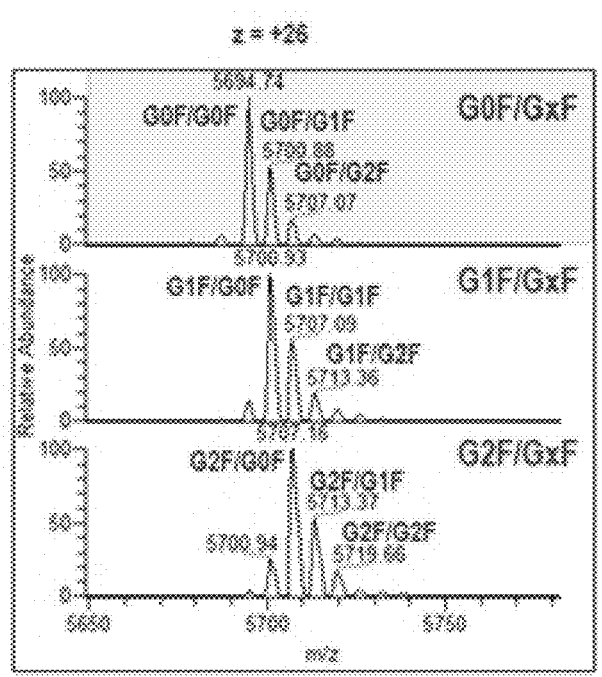

The impacts of terminal galactose in IgG affecting FcγRIIIa binding were investigated using the methods and systems of FcγRIIIa-MS of the present application by analyzing NISTmAb (IgG1). As shown in FIG. 16, increased number of terminal galactose led to increased binding with FcγRIIIa (or ADCC). The contribution of terminal galactose to the binding affinity with FcγRIIIa may be determined by a single Fc N-glycan.

Example 10. Impacts of Fc Glycan Occupancy

Figure 17:
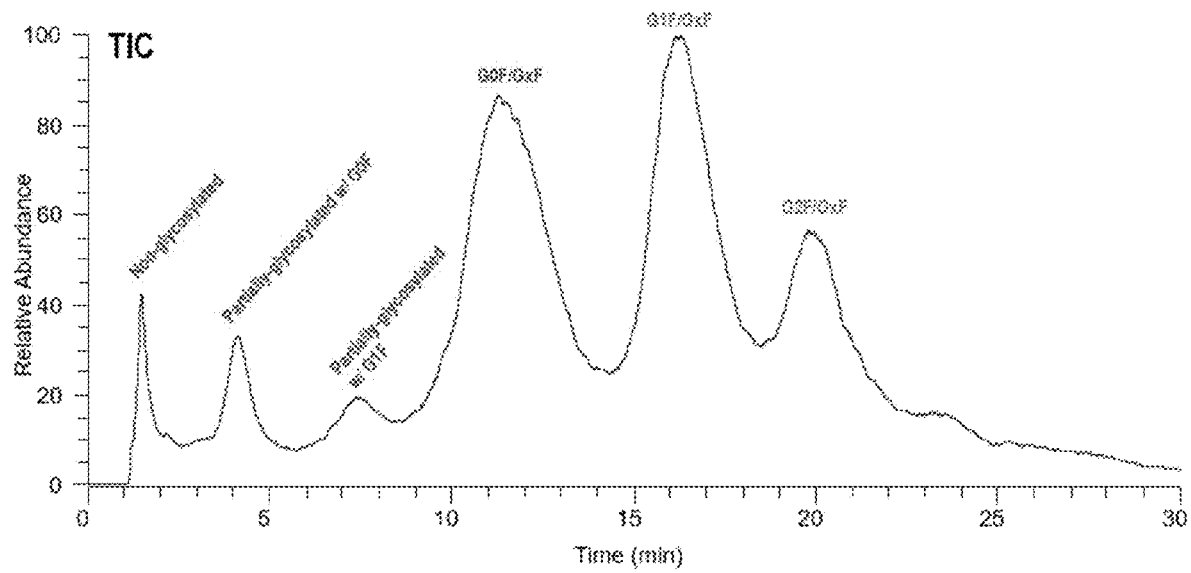
FIG. 17 shows the analysis of MAB8 (IgG4) using the FcγRIIIa-MS of the present application to study the impacts of Fc glycan occupancy in IgG affecting FcγRIIIa binding according to an exemplary embodiment.
Figure 17:
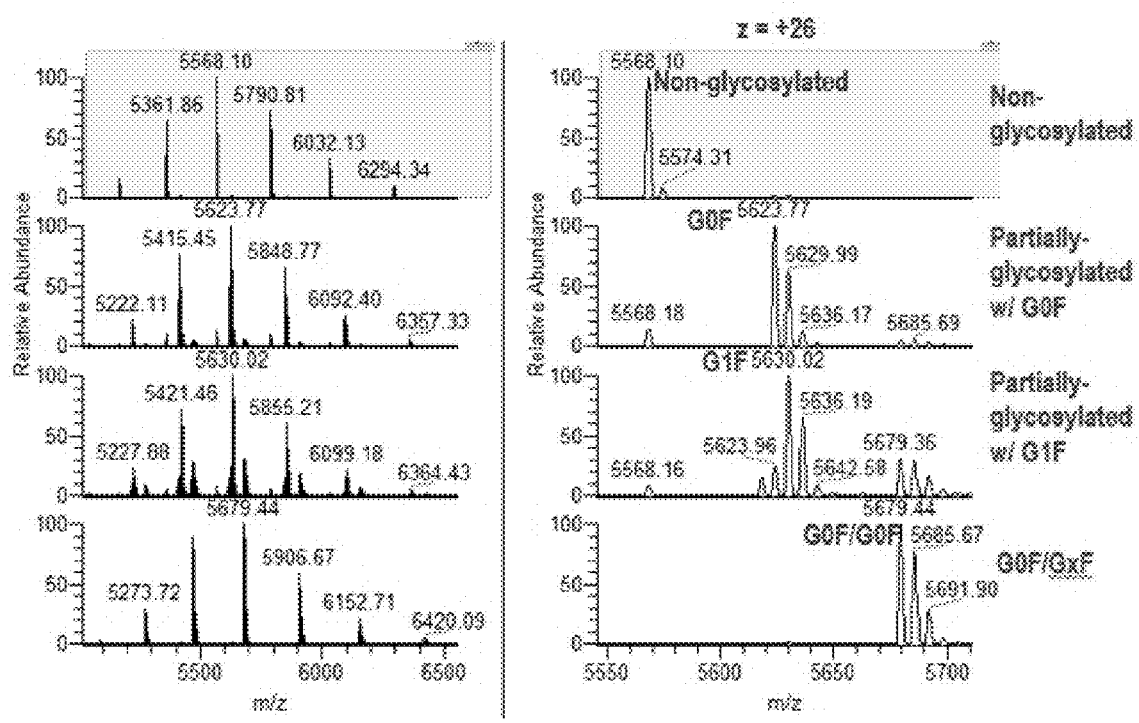
Figure 18:
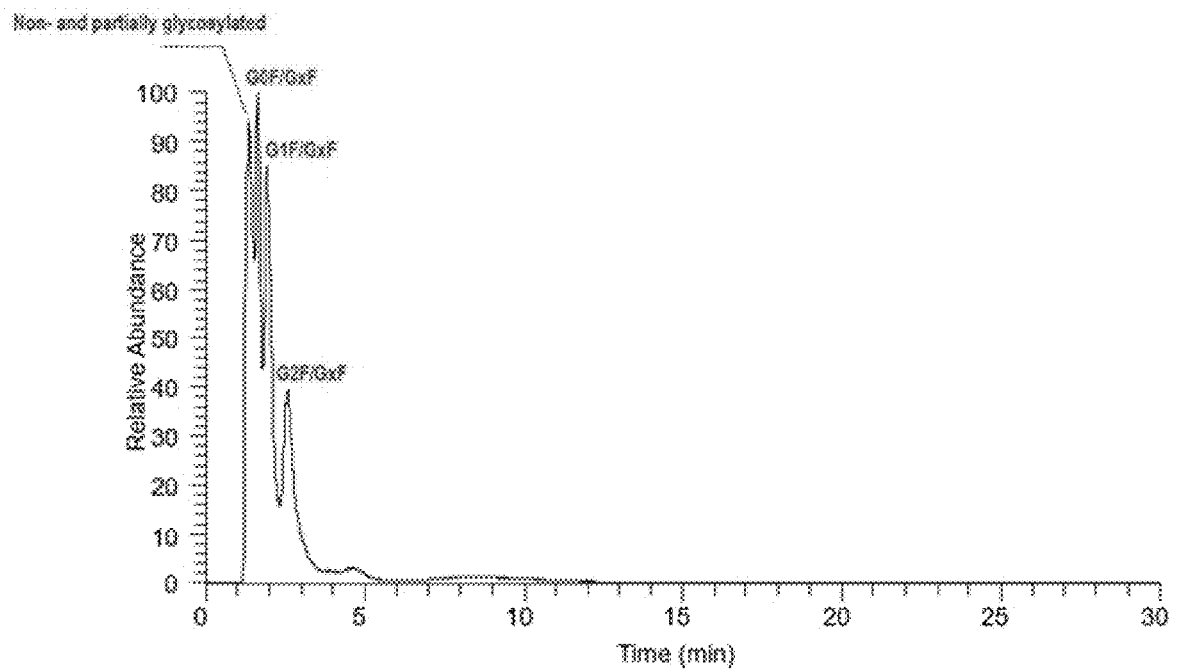
FIG. 18 shows the analysis of stealth format of MAB10 (IgG4S) using the FcγRIIIa-MS of the present application to study the impacts of Fc glycan occupancy in IgG affecting FcγRIIIa binding according to an exemplary embodiment.
Figure 18:
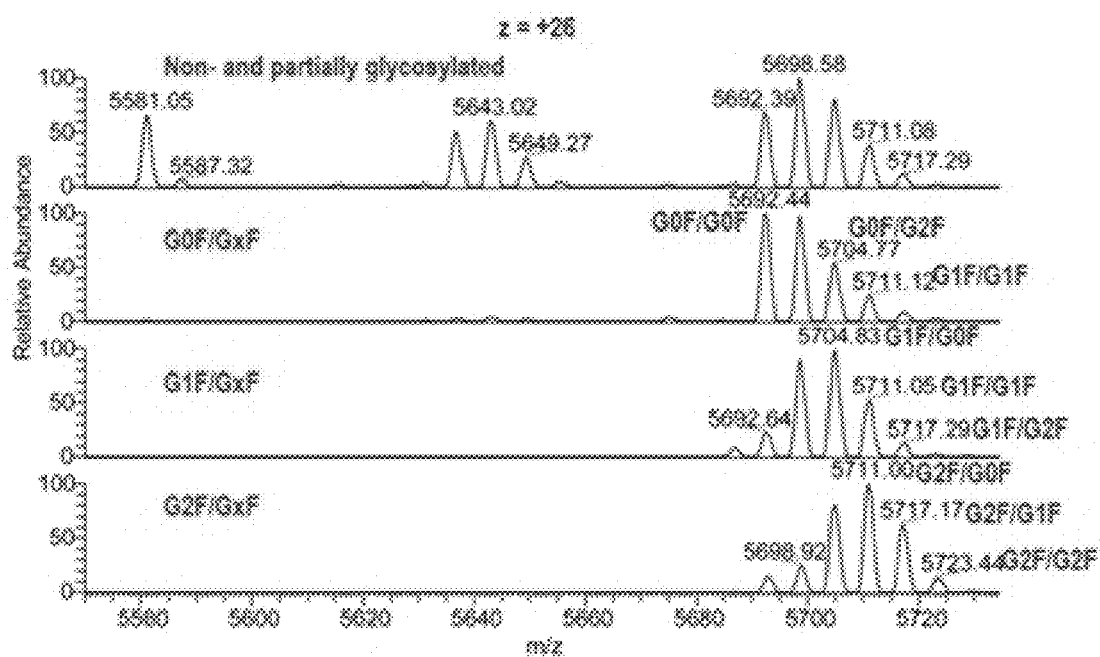

The impacts of Fc glycan occupancy in IgG affecting FcγRIIIa binding were investigated using the methods and systems of FcγRIIIa-MS of the present application by analyzing MAB8 (IgG4). Higher glycan occupancy led to increased binding with FcγRIIIa (or ADCC) as shown in FIG. 17. The impacts of Fc glycan occupancy in IgG affecting FcγRIIIa binding were further investigated using the methods and systems of FcγRIIIa-MS of the present application by analyzing stealth format of MAB10 (IgG4S). IgG4S showed very weak binding with FcγRIIIa (or ADCC) as shown in FIG. 18. However, Fc glycan occupancy-based separation was still achieved.

Example 11. Impacts of Core Fucose

Figure 19:
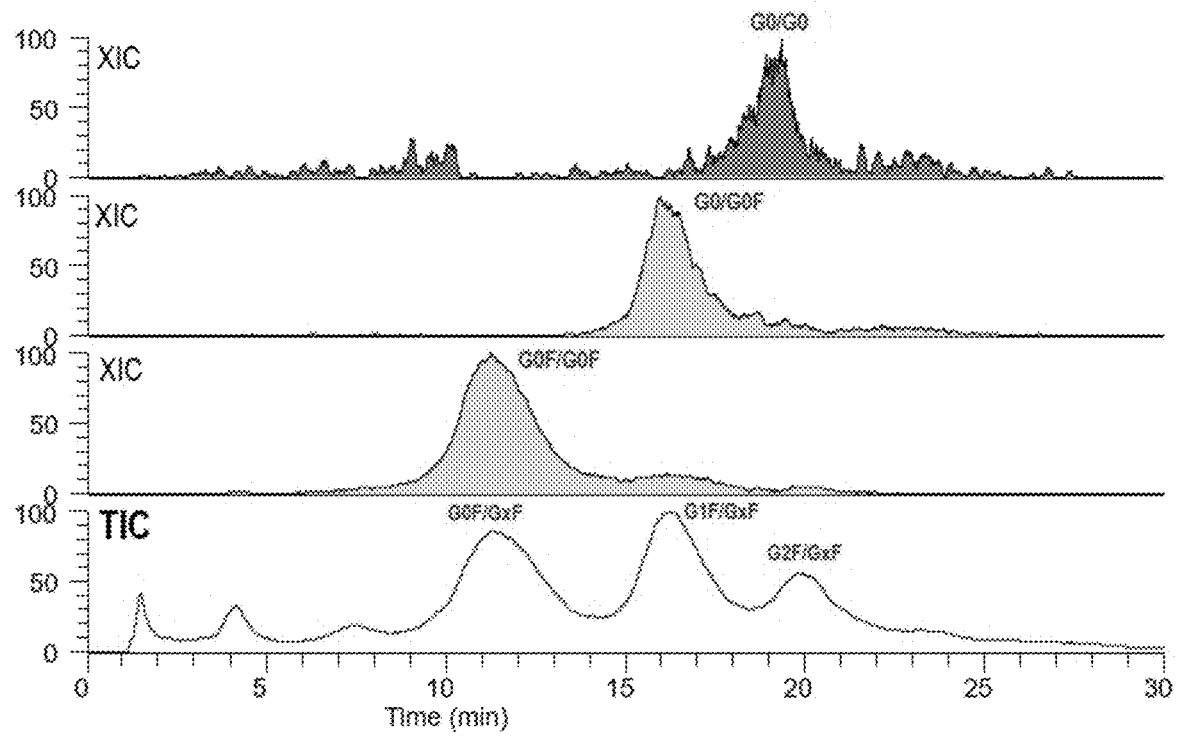
FIG. 19 shows the analysis of MAB8 (IgG4) using the FcγRIIIa-MS of the present application to study the impacts of core fucose in IgG affecting FcγRIIIa binding according to an exemplary embodiment.
Figure 19:
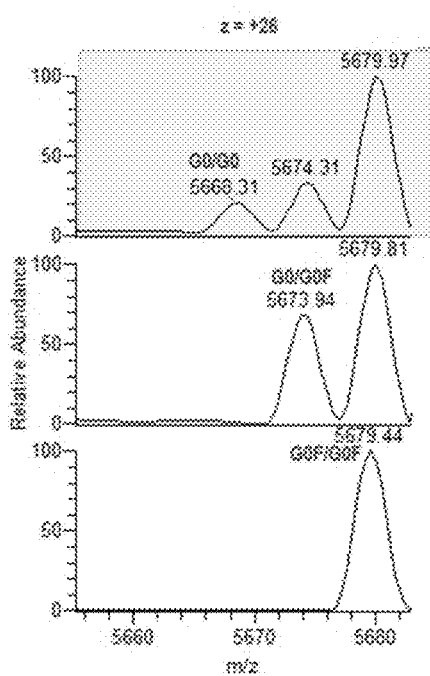

The impacts of core fucose in IgG affecting FcγRIIIa binding were investigated using the methods and systems of FcγRIIIa-MS of the present application by analyzing MAB8 (IgG4). Increased number of fucose led to decreased binding with FcγRIIIa (or ADCC) as shown in FIG. 19.

Example 12. Impacts of Bisecting GlcNAc

Figure 20:
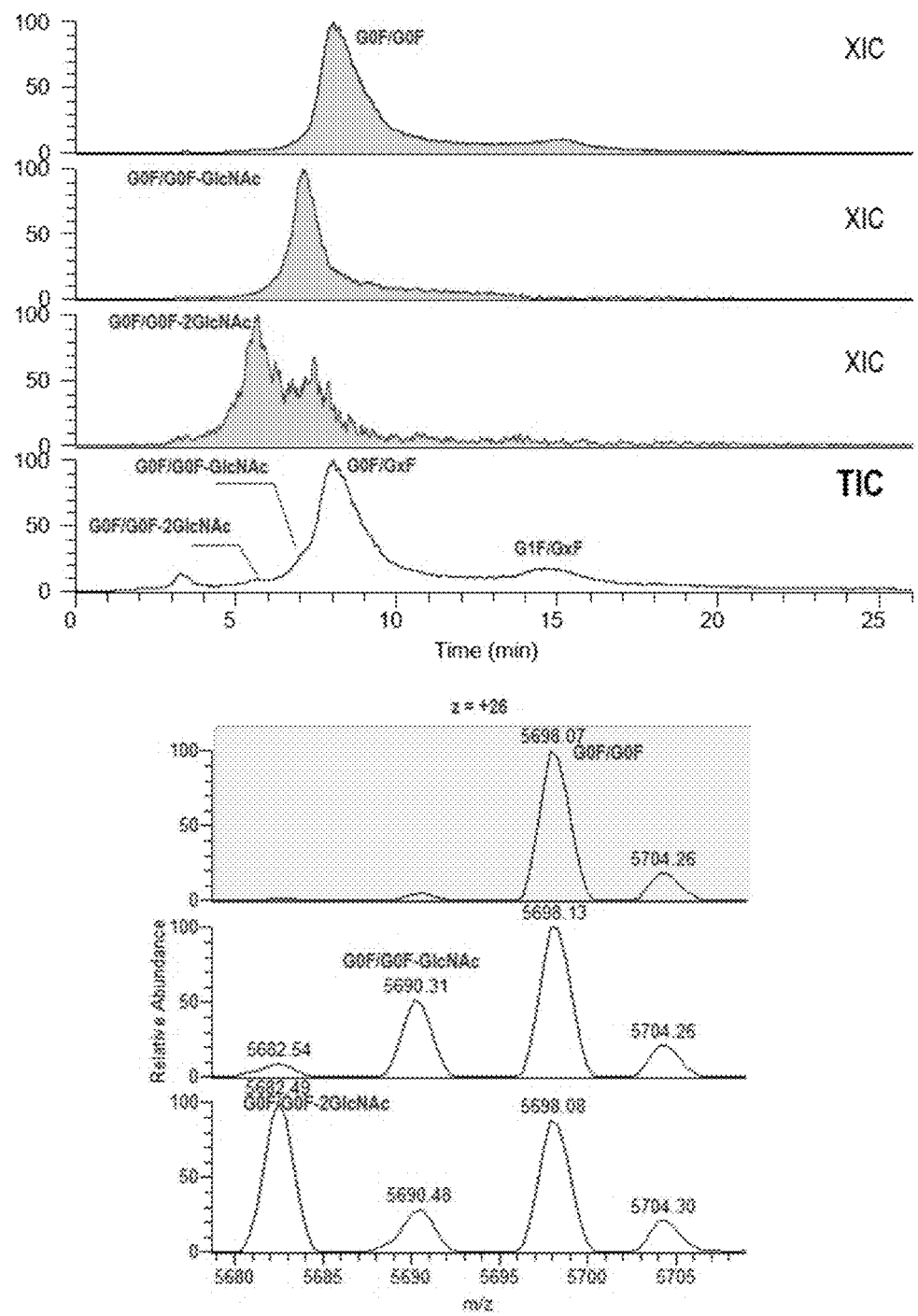
FIG. 20 shows the analysis of MAB9 (IgG4) using the FcγRIIIa-MS of the present application to study the impacts of bisecting GlcNAc affecting FcγRIIIa binding according to an exemplary embodiment.

The impacts of bisecting GlcNAc affecting FcγRIIIa binding were investigated using the methods and systems of FcγRIIIa-MS of the present application by analyzing MAB9 (IgG4). Decreased number of bisecting GlcNAc led to decreased binding FcγRIIIa (or ADCC) as shown in FIG. 20.

Example 13. Impacts of Man5

Figure 21:
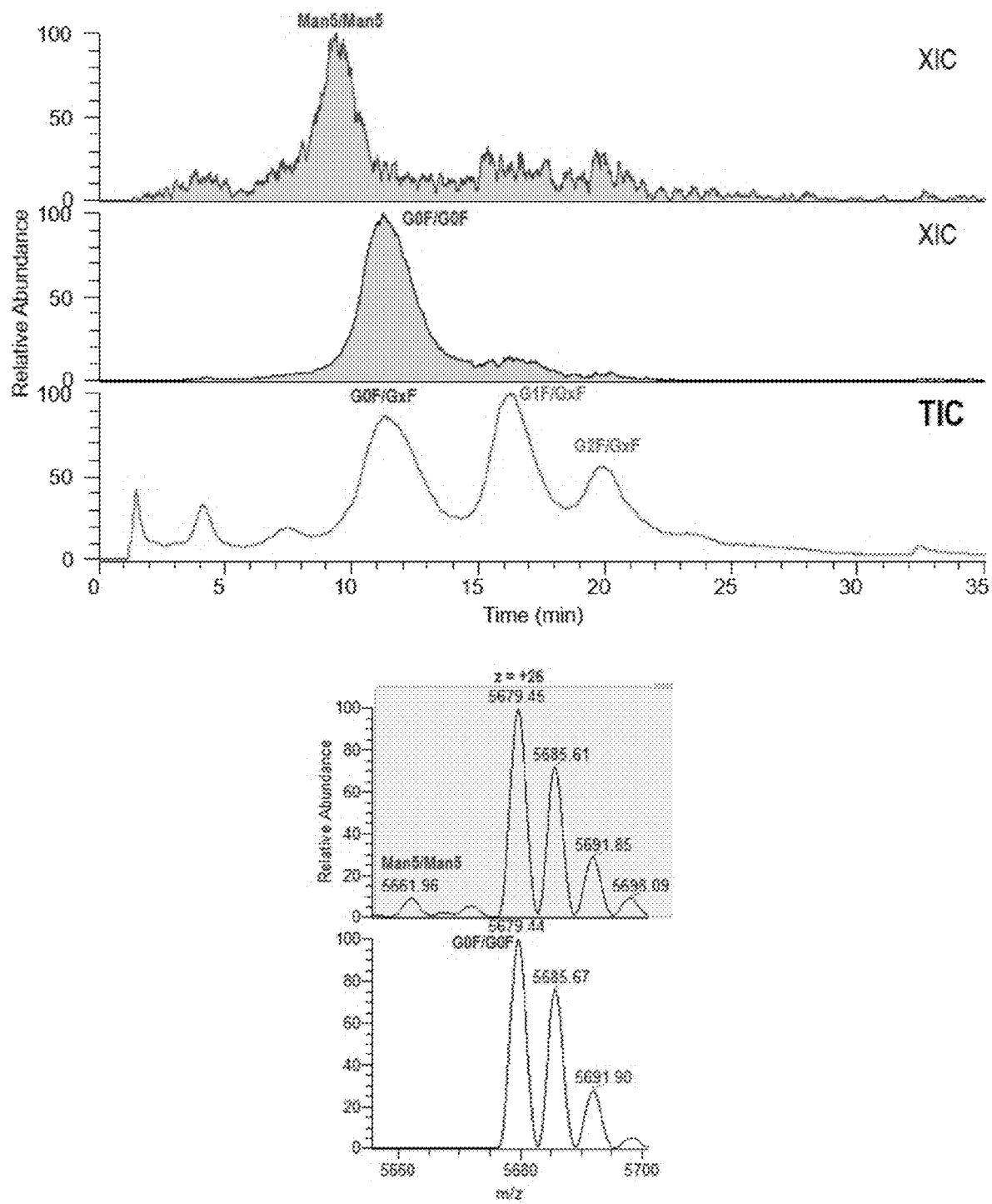
FIG. 21 shows the analysis of MAB8 (IgG4) using the FcγRIIIa-MS of the present application to study the impacts of Man5 affecting FcγRIIIa binding according to an exemplary embodiment.

The impacts of Man5 affecting FcγRIIIa binding were investigated using the methods and systems of FcγRIIIa-MS of the present application by analyzing MAB8 (IgG4). Man5/Man5 led to slightly decreased affinity binding in comparing to G0F/G0F as shown in FIG. 21.

Example 14. Comparative Studies

Figure 22:
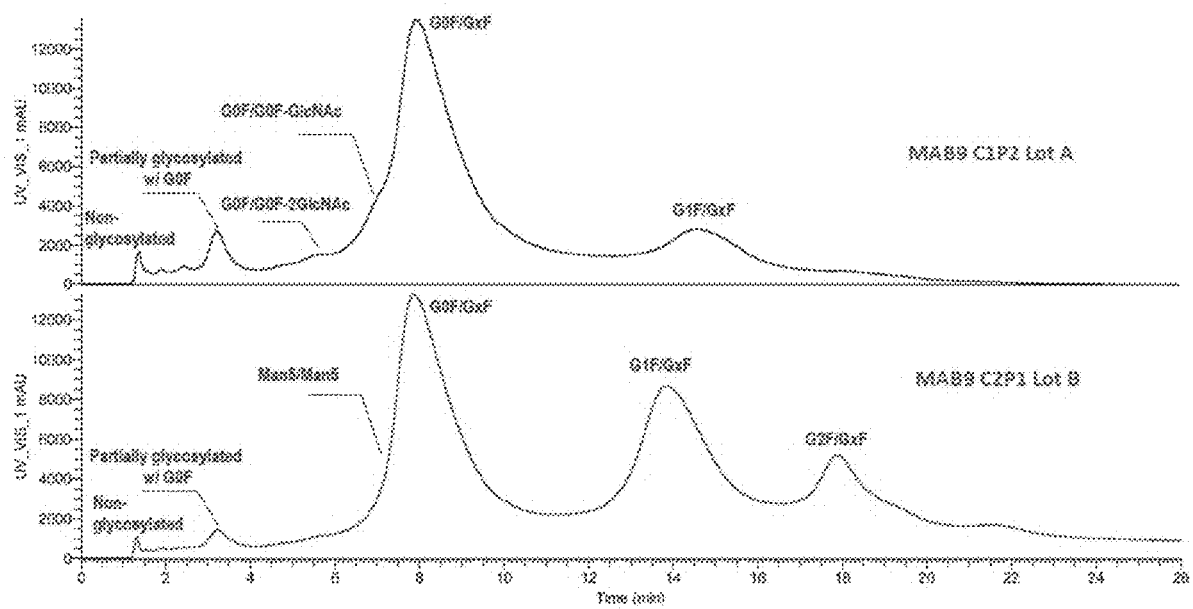
FIG. 22 shows the analysis of MAB9 C1P2 Lot A and MAB9 C2P1 Lot B using the FcγRIIIa-MS of the present application to study glycan-based separation for intact mass analysis under native conditions according to an exemplary embodiment.

The methods and systems of FcγRIIIa-MS of the present application were compared with RPLC-MS for glycan-based separation. MAB9 C1P2 Lot A and MAB9 C2P1 Lot B were analyzed using the methods and systems of FcγRIIIa-MS of the present application as shown in FIG. 22. The results indicate that the FcγRIIIa-MS of the present application is a good alternative for intact mass analysis under native conditions to provide glycan-based separation with more in-depth identifications.

Figure 23A:
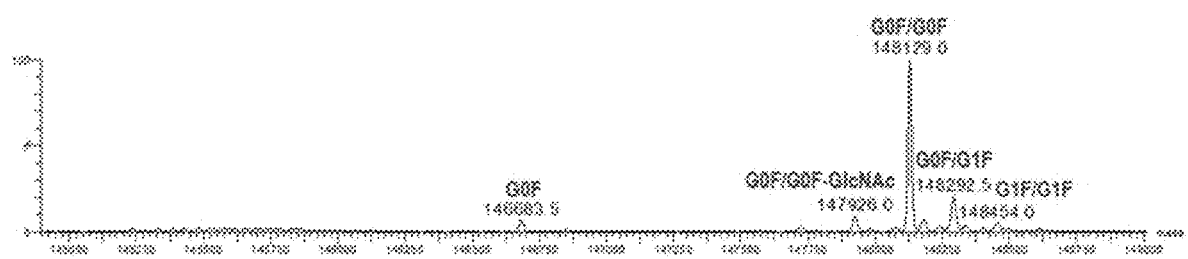
FIG. 23A shows the analysis of MAB9 C1P2 DS Lot A in comparing the FcγRIIIa-MS of the present application and RPLC-MS for glycan-based separation according to an exemplary embodiment.
Figure 23A:
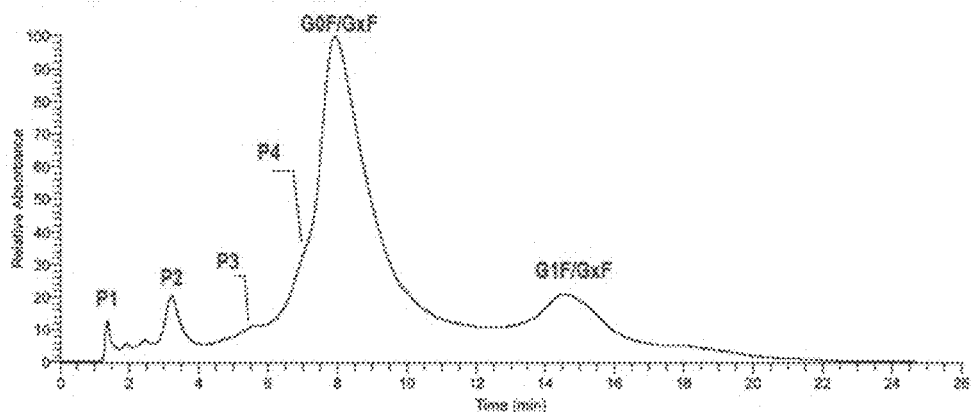
Figure 23B:
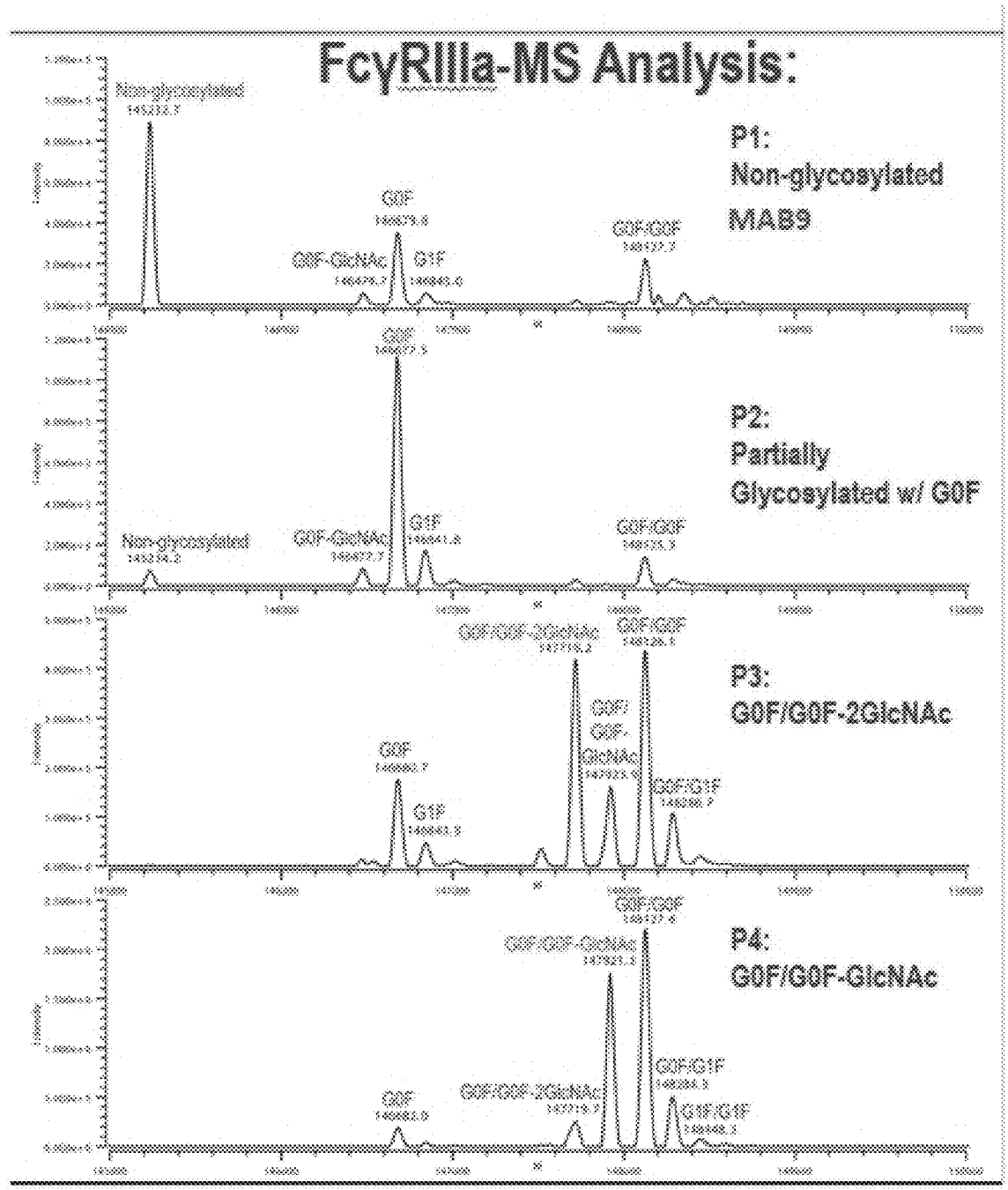
FIG. 23B shows the analysis of MAB9 C1P2 DS Lot A using the FcγRIIIa-MS of the present application in comparing the FcγRIIIa-MS and RPLC-MS for glycan-based separation according to an exemplary embodiment.

The methods and systems of FcγRIIIa-MS of the present application were compared with RPLC-MS by analyzing MAB9 C1P2 DS Lot A. In comparing to RPLC-MS, the FcγRIIIa-MS of the present application allows better glycan-based separation by better discerning the non-glycosylated, partially glycosylated, G0F/G0E-2GlcNAc, and G0F/G0F-GlcNAc peaks as shown in FIGS. 23A and 23B.

Figure 24A:
FIG. 24A shows the analysis of MAB9 C2P1 FDS Lot B in comparing the FcγRIIIa-MS and RPLC-MS for glycan-based separation according to an exemplary embodiment.
Figure 24A:
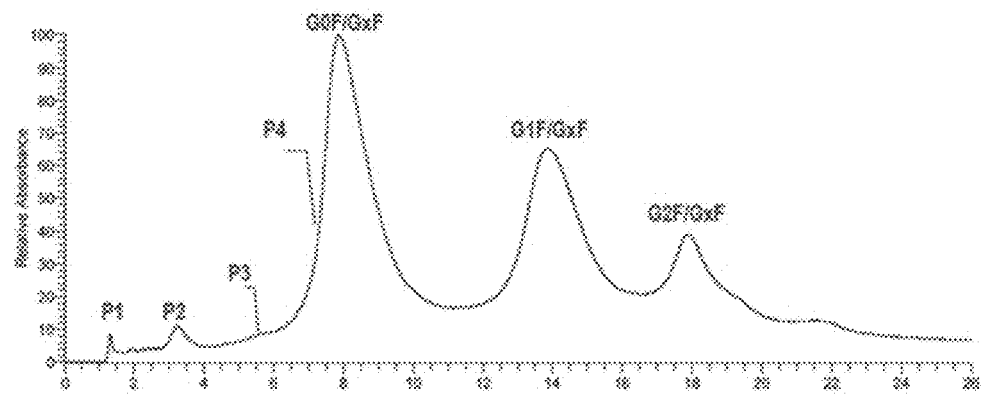
Figure 24B:
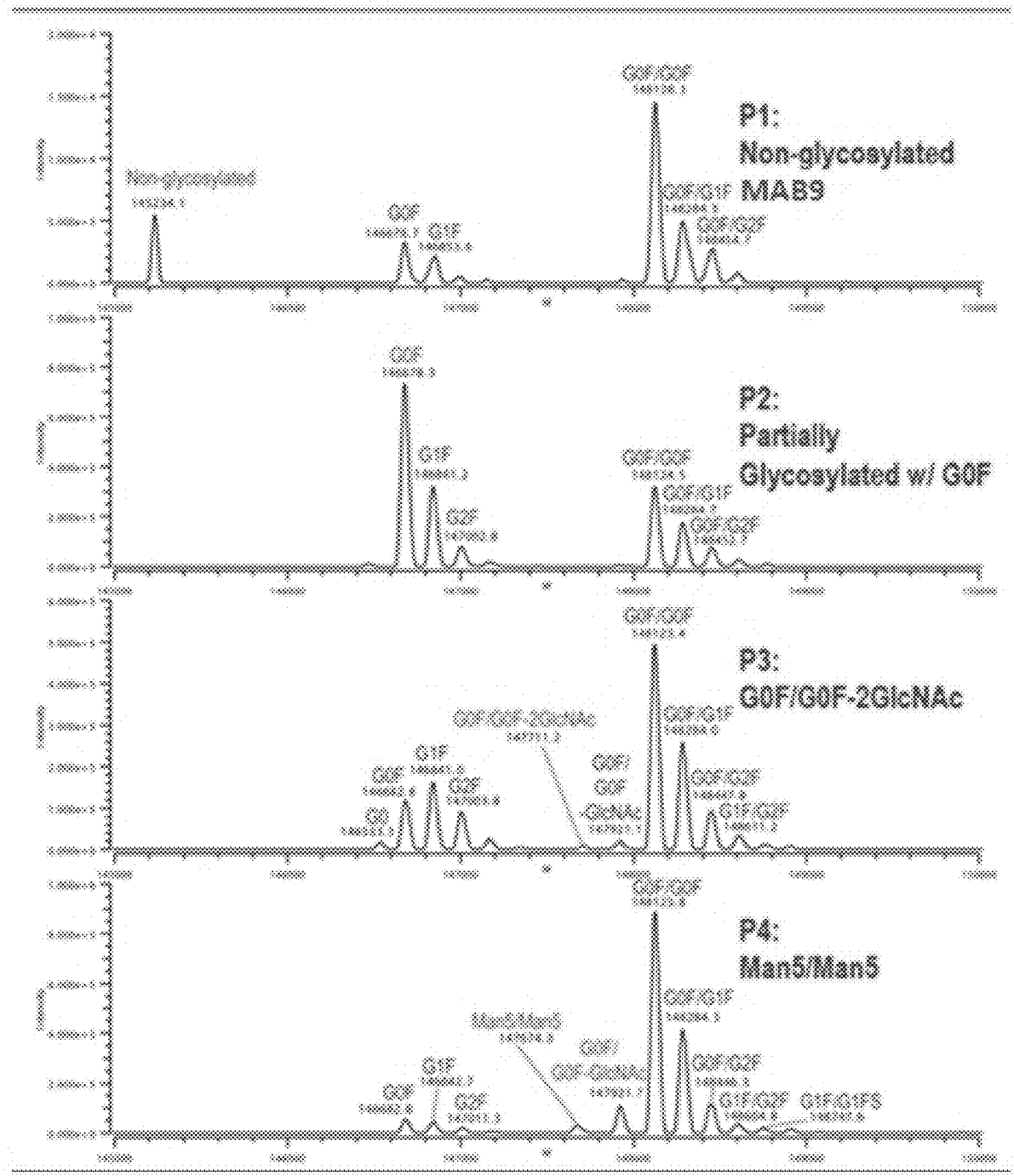
FIG. 24B shows the analysis of MAB9 C2P1 FDS Lot B using the FcγRIIIa-MS of the present application in comparing the FcγRIIIa-MS and RPLC-MS for glycan-based separation according to an exemplary embodiment.

The methods and systems of FcγRIIIa-MS of the present application were compared with RPLC-MS by analyzing MAB9 C2P1 FDS Lot B. In comparing to RPLC-MS, the FcγRIIIa-MS of the present application allows better glycan-based separation by better discerning the non-glycosylated, partially glycosylated, G0F/G0E-2GlcNAc, and Man5/Man5 peaks as shown in FIGS. 24A and 24B.

What is claimed is:

1. A method for identifying at least one peptide or protein in a sample, comprising:
    contacting the sample to a solid surface, wherein the solid surface comprises an affinity-binding molecule of the at least one peptide or protein;
    washing the solid surface with a mobile phase to produce at least one eluant, wherein the mobile phase consists of an acidic mobile phase having a pH value of about pH 1.0-4.6, and wherein the eluant comprises the at least one peptide or protein in the acidic mobile phase; and
    providing the eluant to a mass spectrometer comprising an orbitrap mass analyzer operating under native conditions to characterize the at least one peptide or protein comprising low-abundance post-translational modifications in the at least one eluant.

2. The method of claim 1, further comprising generating at least one separation profile.

3. The method of claim 2, further comprising identifying or quantifying the at least one peptide or protein based on the at least one separation profile.

4. The method of claim 2, further comprising identifying or quantifying a level of post-translational modification or post-translational modification variation of the at least one peptide or protein based on the at least one separation profile or a comparison with another separation profile.

5. The method of claim 2, further comprising identifying or quantifying a level of glycosylation or glycosylation variation of the at least one peptide or protein based on the at least one separation profile or a comparison with another separation profile.

6. The method of claim 5, wherein the glycosylation is terminal galactose, Fc glycan occupancy, core fucose, bisecting GlcNAc, or Man5.

7. The method of claim 2, further comprising separating or identifying an impurity in the sample based on the at least one separation profile or a comparison with another separation profile.

8. The method of claim 2, wherein the at least one peptide or protein is a drug, an antibody, a bispecific antibody, a monoclonal antibody, a fusion protein, an antibody-drug conjugate, an antibody fragment, or a protein pharmaceutical product.

9. The method of claim 8, further comprising quantifying a drug-to-antibody ratio of the antibody-drug conjugate based on the at least one separation profile or a comparison with another separation profile.

10. The method of claim 1, wherein the solid surface comprising the affinity-binding molecule of the at least one peptide or protein is included in a chromatography column.

11. The method of claim 10, wherein the mass spectrometer is coupled online to the chromatography column.

12. The method of claim 1, wherein the affinity-binding molecule of the at least one peptide or protein is protein A, protein G, Fcγ receptor, FcγRIIIa, anti-human Fc antibody, neonatal Fc receptor, Fc epsilon RI, anti-idiotype antibody, or complement component C1q.

13. The method of claim 10, wherein a splitter is used to connect the mass spectrometer and the chromatography column.

14. The method of claim 13, wherein the splitter is used to divert a low flow to the mass spectrometer and a high flow to a detector.

15. The method of claim 1, wherein the eluant comprising the at least one peptide or protein in the acidic mobile phase is provided directly to the mass spectrometer without pretreatment or adjusting the pH value of the mobile phase.

16. The method of claim 1, wherein the mobile phase comprises ammonium acetate, acetic acid, or a combination thereof.

17. The method of claim 10, wherein the mobile phase is used to wash the chromatography column and has a flow rate of about 0.2-0.6 mL/min.

18. The method of claim 1, wherein the mass spectrometer is an electrospray ionization mass spectrometer, nano-electrospray ionization mass spectrometer, a triple quadrupole mass spectrometer, a quadrupole mass spectrometer or a ultra-high mass range hybrid quadrupole mass spectrometer.

19. The method of claim 1, wherein contacting the sample to the solid surface comprises using an alkaline solution with a pH value of about pH 5.0-9.0.

* * * * *